(12) United States Patent
Koga

(10) Patent No.: US 11,198,055 B2
(45) Date of Patent: Dec. 14, 2021

(54) GAME MACHINE

(71) Applicant: DYNAMIC GAMES MACAU LIMITED, Tokyo (JP)

(72) Inventor: Tatsuhiro Koga, Tokyo (JP)

(73) Assignee: DYNAM JAPAN HOLDINGS CO., LTD., Tokyo (JP)

( * ) Notice: Subject to any disclaimer, the term of this patent is extended or adjusted under 35 U.S.C. 154(b) by 7 days.

(21) Appl. No.: 16/616,076

(22) PCT Filed: May 26, 2017

(86) PCT No.: PCT/JP2017/019660
§ 371 (c)(1),
(2) Date: Apr. 27, 2020

(87) PCT Pub. No.: WO2018/216186
PCT Pub. Date: Nov. 29, 2018

(65) Prior Publication Data
US 2020/0246684 A1   Aug. 6, 2020

(51) Int. Cl.
*A63F 7/02* (2006.01)
*G07F 17/32* (2006.01)

(52) U.S. Cl.
CPC .......... *A63F 7/027* (2013.01); *G07F 17/3297* (2013.01)

(58) Field of Classification Search
CPC .. A63F 7/027; A63F 7/02; A63F 7/022; A63F 7/025; G07F 17/3297
USPC .......................................................... 463/3
See application file for complete search history.

(56) References Cited

U.S. PATENT DOCUMENTS

| 6,854,729 B2* | 2/2005 | Yamaguchi ......... G07F 17/3297 273/121 B |
| 7,247,094 B2* | 7/2007 | Hosaka .................... A63F 7/022 463/17 |
| 2007/0049370 A1* | 3/2007 | Watanabe ............... G07F 17/32 463/16 |

(Continued)

FOREIGN PATENT DOCUMENTS

JP          03121085 A    *   5/1991

OTHER PUBLICATIONS

Machine Translation of JP03121085A. "https://dialog.proquest.com/professional/cv_2183530/docview/1378449781/17862859C0D3AE99BE1/5?accountid=131444" (Year: 1991).*

*Primary Examiner* — Allen Chan
(74) *Attorney, Agent, or Firm* — Manabu Kanesaka

(57) ABSTRACT

A game machine includes a first game processing portion performing game processing in a first mode; a second game processing portion performing game processing in a second mode; and a return processing portion performing return processing of a virtual game ball remaining on a virtual board face in a case of satisfying a predetermined condition. The first game processing portion displays at least a virtual board face and a first virtual winning port, and after the virtual game ball launched onto the virtual board face enters the first virtual winning port, the first virtual winning port is deleted from the virtual board face, and the second game processing portion displays a second virtual winning port capable of acquiring a winning ball on the virtual board face. In case the virtual game ball enters the first virtual winning port or second virtual winning port, the return processing portion operates.

6 Claims, 16 Drawing Sheets

(56) References Cited

U.S. PATENT DOCUMENTS

2012/0077574 A1\* 3/2012 Walker ................ G07F 17/3225
463/25

\* cited by examiner

GAME MACHINE

CROSS-REFERENCE TO RELATED APPLICATION

The present application is based on PCT International Application No. PCT/JP2017/019660 filed on May 26, 2017, the disclosure of which is incorporated herein.

FIELD OF TECHNOLOGY

The present invention relates to a game machine for reproducing a physical movement of a Pachinko machine by a computer simulation.

BACKGROUND ART

In Japan, among some enthusiasts, Pachinko is popular as a familiar leisure. In Pachinko, a handle provided on a Pachinko board is rotated in a predetermined direction so as to flip game balls (Pachinko balls), which are steel balls rented for a fee at a store, on a board face where many nails and the like are mounted, and to enter the game balls falling down while hitting the nails and the like on the board face into a specific winning port so as to obtain a predetermined number of winning balls (Pachinko balls). On the other hand, in a case wherein the game balls reach a lower end of the board face without entering a winning port, the game balls enter an out port provided in a board-face lower end portion, and the game balls are collected. Both the game balls and the winning balls are the Pachinko balls, the Pachinko balls flipped on the board face are the game balls, and the Pachinko balls obtained as a result of entering the game balls into the winning port are the winning balls. The winning balls can be used as the game balls. Therefore, a player can enjoy Pachinko for a long time since the game balls in hand increase by entering the game balls into the winning port.

Here, a schematic structure of a Pachinko machine (a mechanical-type Pachinko machine) 100 for carrying out Pachinko will be explained with reference to FIG. 16. The Pachinko machine 100 comprises a board face 101 where many nails and the like are provided; a glass plate 102 covering the board face 101; an upper tray 110 in which the Pachinko balls are put; a handle 120 operated by a player to flip the game balls (the Pachinko balls) put onto the board face 101; and a rail 130 guiding the game balls flipped by the handle 120. Also, on the board face 101, there is provided a winning port 140, and when the game balls falling down on the board face 101 enter the winning port 140, the predetermined number of winning balls (Pachinko balls) is arranged to be forced out onto the upper tray 110. The player operates the handle 120 so as to enter as much game balls as possible into the winning port 140, and when the player obtains a desired amount of winning balls, the player exchanges the balls to a prize prepared by the store.

Conventionally, there is known the game machine (hereinafter, called a "digital Pachinko" for convenience of explanation) in which a movement of the Pachinko machine as mentioned above is reproduced by computer simulation so as to play with a feeling almost similar to an actual Pachinko machine, and there are proposed digital Pachinko machines shown in, for example, the following Patent Document 1 to Patent Document 8.

The digital Pachinko machines from the Patent Document 1 to the Patent Document 5 are made by reproducing the conventional mechanical-type Pachinko machine by computer simulation using a display device such as a CRT display, a liquid crystal display, or the like. Therefore, they are made by simply digitizing the conventional mechanical-type Pachinko machine.

In the digital Pachinko machines from the Patent Document 6 to the Patent Document 8, in a case wherein a predetermined event occurs, there are carried out performances of changing a position or a size of a starting port and the winning port located on the board face displayed by the display device; changing an arrangement of the nails; changing a shape or a color of the game balls; and the like.

PRIOR ART DOCUMENTS

Patent Documents

Patent Document 1: Japanese Utility Model Publication No. S57-60680
Patent Document 2: Japanese Patent Application Publication No. S60-75072
Patent Document 3: Japanese Patent Application Publication No. H06-254215
Patent Document 4: Japanese Patent Application Publication No. H10-57561
Patent Document 5: Japanese Patent Application Publication No. H11-128446
Patent Document 6: Japanese Patent Application Publication No. 2003-220187
Patent Document 7: Japanese Patent Application Publication No. 2003-225465
Patent Document 8: Japanese Patent Application Publication No. 2005-288031

SUMMARY OF THE INVENTION

Problems to be Solved by the Invention

A conventional digital Pachinko is digitized by imitating a mechanical-type Pachinko machine, so that if a player has an experience of playing a game by the mechanical-type Pachinko machine, the player can recognize where to enter a game ball (hereinafter, called a "virtual game ball") virtually displayed on a board face (hereinafter, called a "virtual board face") virtually displayed in a display device of the digital Pachinko, i.e. how to enjoy the game. However, in a case wherein a player with no experience of the game by the mechanical-type Pachinko machine, or a player with no knowledge regarding Pachinko attempts to do the game by the digital Pachinko, there can be assumed that the player does not know where to enter the virtual game ball launched onto the virtual board face by operating a handle.

Especially, in the mechanical-type Pachinko machine, after the player launches the game ball onto the board face by operating the handle, the game ball falls on the board face while hitting a pinwheel or a nail, and comes to enter a winning port or a starting port, or an out port. Consequently, there are various devices other than the nail on the board face, and there is a case wherein a beginner does not know where to enter the game ball, thereby not enjoying the game. Especially, the beginner does not understand the difference of the role of the winning port or the starting port, and also there are many cases wherein the beginner does not even understand which is the winning port or which is the starting port. Consequently, for the beginner, the conventional digital Pachinko wherein the mechanical-type Pachinko machine is directly digitalized is difficult for enjoying the game.

In order to make the beginner use the digital Pachinko as well, there is a method such that a notice describing how to play is installed near the digital Pachinko, and the like; however, there occurs a burden such that the notice has to be read, and the like. Therefore, there is required a digital Pachinko (a game machine) such that even the beginner can operate without impairing a game performance.

Also, there is the following other problems. In the conventional digital Pachinko, during the game, when the virtual game ball enters the virtual winning port, the virtual game ball remaining on the virtual board face is often deleted or invalidated in order to perform a predetermined presentation and the like. However, if the game ball is deleted or invalidated, the ball thereof will become wasted for the player. Therefore, in order to prevent an occurrence of the wasted virtual game ball, the player comes to hit the next virtual game ball after waiting for the virtual game ball launched onto the virtual board face to enter the virtual winning port or the virtual out port. However, if the player hits the virtual game ball one by one in the aforementioned manner, a consumption speed of the virtual game ball is reduced, and a business efficiency deteriorates for a store so as to be unfavorable. Therefore, in order to make a player launch the virtual game ball continuously, it is possible to perform processing for restoring the once deleted virtual game ball. However, in that case, it is necessary to have the same condition as that before the virtual game ball is deleted, and if the condition becomes a different virtual board face by winning, the meaning of the position of the virtual game ball changes so as to become meaningless for a player even though the player has launched the virtual game ball by aiming at the position. Ultimately, it can lead to a wasted virtual game ball. Therefore, there is desired a game machine such that the virtual game ball does not become wasted for a player, and makes the player hit the virtual game ball continuously.

Furthermore, in a case wherein a player plays the game by the game machine such as the digital Pachinko and the like, there is a case wherein how much money will be consumed is not known. Especially, in playing the game by the game machine thereof for the first time, since a monetary consumption amount is not known, there is an uneasy feeling. Consequently, there is a psychological resistance to playing the game by a new game machine.

Means for Solving the Problems

In view of the aforementioned problems, the present inventor has invented a game machine which is a digital Pachinko wherein even a beginner can operate immediately without impairing a game performance as well.

The first aspect of the invention is a game machine comprising an input device and a display device in a housing, and the game machine comprises a first game processing portion performing game processing in a first mode; a second game processing portion performing game processing in a second mode; and a return processing portion performing return processing of a virtual game ball remaining on a virtual board face in a case of satisfying a predetermined condition. Also, as the game processing in the first mode, the first game processing portion displays at least a virtual board face and a first virtual winning port for transiting to the second mode on the display device, and after the virtual game ball launched on to the virtual board face based on an operation by the input device enters the first virtual winning port, the first virtual winning port is deleted from the virtual board face, and as the game processing in the second mode, in the display device, the second game processing portion displays a second virtual winning port capable of acquiring winning balls on the virtual board face. Also, in a case wherein the virtual game ball enters the first virtual winning port in the first mode, and/or in a case wherein the virtual game ball enters the second virtual winning port in the second mode, the return processing portion specifies a number of virtual game balls remaining on the virtual board face, deletes them from the display device, and adds the specified number to a number of virtual game balls at hand of a player. Also, the first game processing portion or the second game processing portion calculates and displays a maximum monetary consumption amount per unit time by calculating it using a maximum number of virtual game balls capable of being launched per unit time and a selected exchange rate.

By constituting the game machine according to the present invention, as a winning port, the first virtual winning port is displayed in the first mode, and the second virtual winning port is displayed in the second mode, so that it becomes apparent to a player having no knowledge of the game machine that the player just has to hit by aiming there so as to provide the game machine in which even the beginner can operate immediately without impairing the game performance as well.

Also, after winning, the virtual game ball remaining on the virtual board face is deleted from the display device; however, that is returned as a ball at hand (a credit) so as not to waste for a player as well. As a result, the player launches the virtual game ball continuously so as to improve a business efficiency for a store as well.

Furthermore, the maximum monetary consumption amount per unit time is displayed, so that even a player who plays the game machine for the first time, or the beginner can play the game at ease.

A second aspect of the invention is the game machine comprising the input device and the display device in the housing, and the game machine comprises the first game processing portion performing the game processing in the first mode; and the second game processing portion performing the game processing in the second mode. Also, as the game processing in the first mode, the first game processing portion displays at least the virtual board face and the first virtual winning port for transitioning to the second mode on the display device, and after the virtual game ball launched onto the virtual board face based on the operation by the input device enters the first virtual winning port, the first virtual winning port is deleted from the virtual board face, and as the game processing in the second mode, on the display device, the second game processing portion displays the second virtual winning port capable of acquiring the winning ball on the virtual board face.

By constituting the game machine according to the present invention, as with the first aspect of the invention, as the winning port, the first virtual winning port is displayed in the first mode, and the second virtual winning port is displayed in the second mode, so that it becomes apparent to a player having no knowledge of the game machine that the player just has to hit a ball by aiming there so as to provide the game machine in which even the beginner can operate immediately without impairing the game performance as well.

In a third aspect of the invention, the game machine can be formed such that in the second game processing portion, after the virtual game ball launched onto the virtual board face based on the operation by the input device enters the second virtual winning port displayed on the virtual board face, the number of won virtual game balls thereof set in the second virtual winning port is added to the ball at hand of the virtual game ball of a player as the winning ball.

In a fourth aspect of the invention, the game machine can be formed such that in the second game processing portion, after the virtual game ball launched onto the virtual board face based on the operation by the input device enters the second virtual winning port displayed on the virtual board face, the second virtual winning port is deleted from the virtual board face, and the first game processing portion displays the first virtual winning port on the virtual board face.

After the virtual game ball enters the second virtual winning port, it is preferable to perform processing according to the aforementioned invention.

In a fifth aspect of the invention, the game machine can be formed such that the first game processing portion and/or the second game processing portion calculate/calculates the maximum monetary consumption amount per unit time by calculating it using the maximum number of the virtual game balls capable of being launched per unit time and the selected exchange rate, and displays it on the display device.

The maximum monetary consumption amount per unit time is displayed, so that even a player who plays the game machine for the first time, or the beginner can play the game at ease.

A sixth aspect of the invention is the game machine comprising the input device and the display device in the housing, and the game machine comprises a game processing portion performing the game processing; and the return processing portion performing the return processing of the virtual game ball remaining on the virtual board face. Also, as the game processing, the game processing portion displays at least the virtual board face and the virtual winning port on the display device, and performs processing of determining whether the virtual game ball launched on to the virtual board face based on the operation by the input device has entered the virtual winning port; and the return processing portion specifies the number of virtual game balls remaining on the virtual board face in a case of determining that the virtual game ball has entered the virtual winning port, deletes them from the display device, and adds the specified number to the number of balls at hand of the virtual game balls of a player.

By forming the game machine according to the present invention, as with the first aspect of the invention, the virtual game balls remaining on the virtual board face are deleted from the display device; however, that is returned as the balls at hand (the credit) so as not to become wasted for a player as well. As a result, the player launches the virtual game balls continuously so as to improve the business efficiency for the store as well.

A seventh aspect of the invention is the game machine comprising the display device in the housing, and the game machine comprises the game processing portion performing the game processing, wherein the game processing portion calculates and displays the maximum monetary consumption amount per unit time by calculating it using the maximum number of the virtual game balls capable of being launched per unit time and the selected exchange rate.

In an eighth aspect of the invention, the game machine can be formed such that the game processing portion further calculates and displays the maximum monetary consumption amount per unit time by calculating it using the maximum number of the virtual game balls capable of being launched per unit time, the selected exchange rate, and a base, as the maximum monetary consumption amount per unit time.

A player who plays a game by the game machine for the first time, or a beginner of the game thereof has an uneasy feeling about how much money has to be spent by playing the game. Consequently, there is a psychological resistance to playing the game by a new game machine or an unaccustomed game machine. Therefore, by forming the game machine according to the present invention, since the maximum monetary consumption amount per unit time is displayed, even a player who plays the game by the game machine for the first time, or the beginner can play the game at ease.

Effect of the Invention

The present invention can provide the game machine which is the digital Pachinko wherein even the beginner can operate immediately without impairing the game performance as well.

BRIEF DESCRIPTION OF THE DRAWINGS

FIG. 8 is one example of a screen before paper money or the like is put in.

BEST MODES OF CARRYING OUT THE INVENTION

Figure 1C:
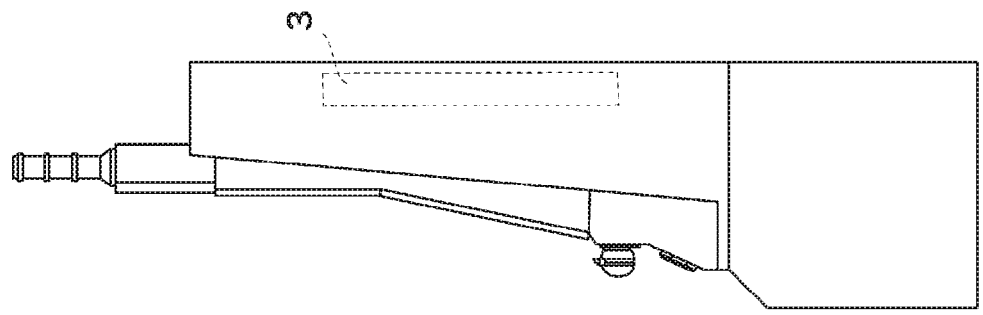
FIGS. 1(*a*), 1(*b*), and 1(*c*) are drawings schematically showing one example of an external appearance of a game machine according to the present invention.
Figure 1B:
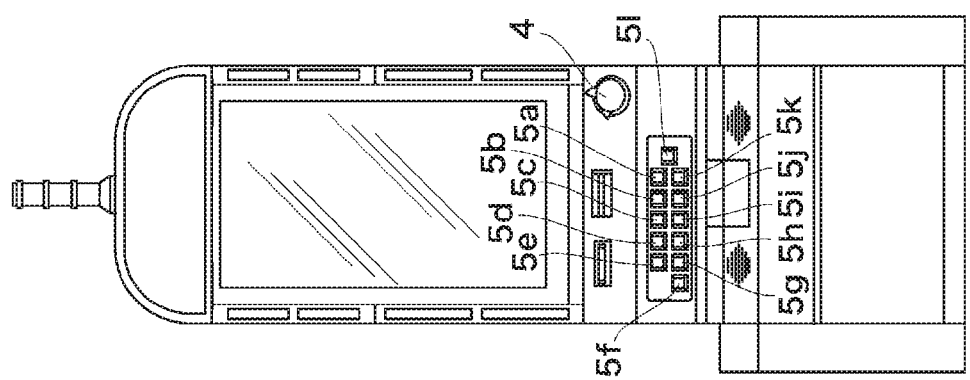
Figure 1A:
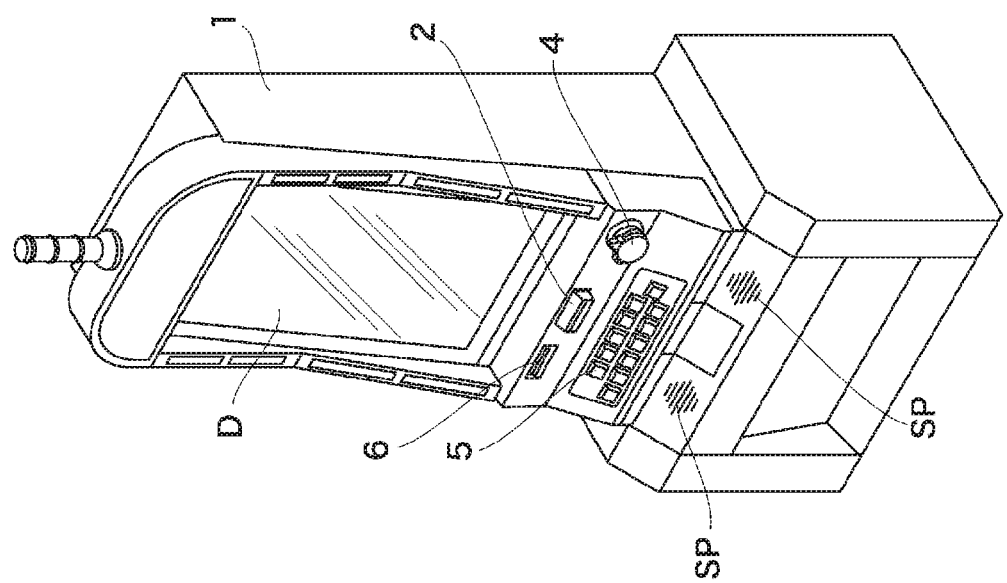

One example of an external appearance of a game machine which is a digital Pachinko of the present invention is schematically shown in FIGS. 1(a), 1(b), and 1(c). A perspective view of the game machine of the present invention is shown in FIG. 1(a); a front view of the game machine is shown in FIG. 1(b); and a side view of the game machine is shown in FIG. 1(c). The game machine is the digital Pachinko which reproduces Pachinko by displaying a board face of a mechanical-type Pachinko machine by a computer simulation, and comprises at least a display device D, speakers SP, and a handle 4 in a housing 1. The display device D displays a virtual board face 201 imitating the board face of the mechanical-type Pachinko machine, and various information necessary for performing Pachinko. For the display device D, an appropriate display device D such as an organic electroluminescence display and the like can be used other than a liquid crystal display. The speakers SP are devices which output sound. The handle 4 is an input device for launching virtual game balls 208 moving on the virtual board face 201 displayed by the display device D, and by rotating the handle 4 in a predetermined direction, based on a rotation angle thereof, a speed for launching the virtual game balls 208 can be adjusted. Incidentally, for the input device for launching the virtual game balls 208, the handle 4 is preferable since it brings a feeling of the mechanical-type Pachinko machine; however, it is not limited to the above. For example, the input device may be a button, a lever, a dial, a slide type knob, and the like.

The display device D is disposed from a substantial center of the housing 1 to an upper side, and the speakers SP are installed at a lower side of the display device D. Also, between the display device D and the speakers SP, there are comprised an amount calculation device 2; the handle 4 as the input device; a button portion 5 for performing various input operations; and a ticket printer 6 for printing a ticket.

In FIGS. 1(a), 1(b), and 1(c), the amount calculation device 2 shows a case of a paper-money insertion port for a player to borrow or buy the virtual game balls 208; however, there may be comprised an input port for a coin (a coin input port). Also, there may be comprised a ticket reader which reads information regarding a money amount (an amount) that a player did not consume when the player played with the game machine in the past. The paper money inserted through the paper-money insertion port, or the coin input through the coin input port is exchanged to the virtual game balls 208 by a rate selected by the later-described rate selection buttons 5a to 5d. For example, when the virtual game balls 208 are 0.2 Hong Kong dollar per one ball, in a case wherein 1,000 Hong Kong dollar bills are inserted through the paper-money insertion port which is the amount calculation device 2, they are exchanged to 5,000 balls of the virtual game balls 208. On the other hand, when the virtual game balls 208 are 1 Hong Kong dollar per one ball, in a case wherein 1,000 Hong Kong dollar bills are inserted through the paper-money insertion port which is the amount calculation device 2, they are exchanged to 1,000 balls of the virtual game balls 208. Incidentally, in the present specification, the number of virtual game balls 208 at hand of a player is a credit, and the amount that is not consumed (a held amount) is the amount.

In a case wherein there is the ticket reader in the amount calculation device 2, for example, information equivalent to the amount that the relevant player holds is coded and printed in a predetermined ticket, and an infrared reading device such as a bar code reader and the like reads the information thereof so as to reflect the information to the amount as the amount of money that the relevant player has input or inserted. Incidentally, the ticket may be a paper, the information regarding the money amount may be coded and printed, or the ticket may be recorded in a cellular phone, an IC card, or the like as electronic information so as to read the information thereof by the ticket reader. For example, coded information regarding the money amount (the amount) may be displayed in the cellular phone so that the ticket reader reads the information, or the information regarding the money amount may be stored in the cellular phone or an IC memory of the IC card, and the ticket reader may perform short-distance wireless communication with the IC memory by a contact or noncontact so as to obtain the information thereof. Incidentally, the paper-money insertion port may have a function of the ticket reader as well.

In the ticket, the information regarding the number of virtual game balls 208 may be coded in place of the information corresponding to the money amount (the amount). In that case, in a case wherein there is a single exchange rate between the money amount and the virtual game balls 208, the information regarding the number of virtual game balls 208 may be read so as to reflect the information directly to the amount and the credit, and in a case wherein there is a plurality of exchange rates, a selected exchange rate is coded as well. In that case, based on the number of virtual game balls 208 and the relevant exchange rate, the information may be converted to the amount, and reflected to the amount so as to reflect to the number of virtual game balls 208 at hand as well. Also, setting may be automatically carried out by the number of balls read from the ticket and the exchange rate.

In the housing 1, there is provided the button portion 5 so as to be capable of performing the various input operations. The buttons 5a to 5d in the button portion 5 function as the rate selection buttons 5a to 5d selecting the rate. The rate selection buttons 5a to 5d are a device receiving a selection of the exchange rate of the virtual game balls 208 exchanged on a basis of the coin input and the paper money inserted in the amount calculation device 2. For example, the rate selection buttons 5a to 5d are four buttons, and by pressing down the button determined beforehand, the exchange rate can be changed. For example, when the rate selection button 5a is pressed down, one ball is set to 0.2 Hong Kong dollar; when the rate selection button 5b is pressed down, one ball is set to 0.6 Hong Kong dollar; when the rate selection button 5c is pressed down, one ball is set to 1.0 Hong Kong dollar; and when the rate selection button 5d is pressed down, one ball is set to the exchange rate of 2.0 Hong Kong dollars. As a rate selection portion carrying out a rate selection, a switch or various input devices can be used other than the button.

Also, as other buttons in the button portion 5, there are provided a language selection button 5e; a button 5f for outputting the ticket from the ticket printer 6; a button 5g for adjusting a volume of sound; a button 5h for displaying a screen of a game description; and a button 5i for displaying a tutorial. Also, there are provided auxiliary buttons 5j and 5k, and a button 5l for calling a store representative. Incidentally, an arrangement of the buttons is not limited to the above, and can be arranged arbitrarily. Also, some buttons may be omitted.

Inside the housing 1, there is comprised a control device for performing various control processings regarding the digital Pachinko.

Figure 2:
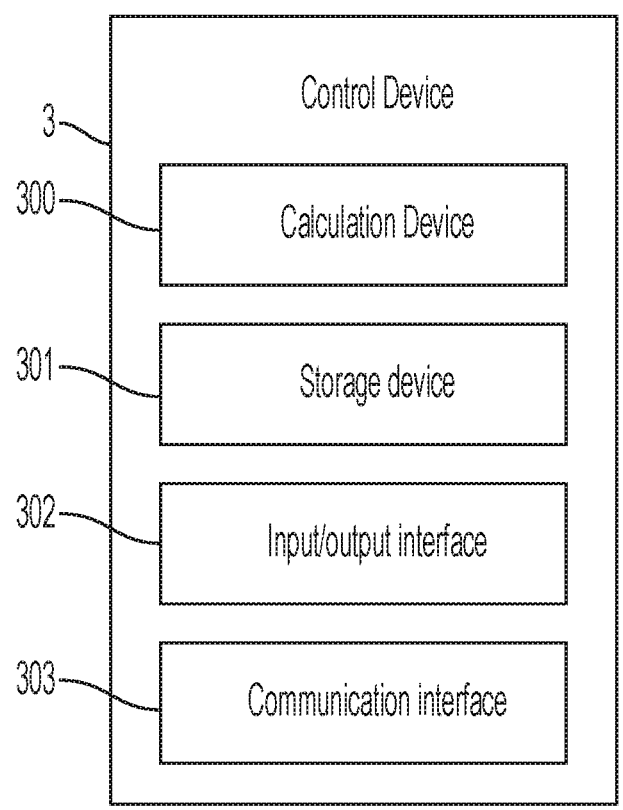
FIG. 2 is a drawing schematically showing one example of a structure of a control device which the game machine includes according to the present invention.

A structure of a hardware of the control device is shown in FIG. 2. The control device 3 comprises an arithmetic device 300, a storage device 301, an input/output interface 302, a communication interface 303, and the like. The arithmetic device 300 corresponds to a CPU performing arithmetic processing of a program, and the like. The storage device 301 corresponds to a memory storing the information, and the arithmetic device 300 performs processing thereof while reading/writing the various information stored in the storage device 301. The input/output interface 302 is the interface with a device which outputs some information to a player such as, for example, the aforementioned display device D, speakers SP, ticket printer 6, and the like. The communication interface 303 is the interface with a communication device (not shown in the drawings) when the relevant game machine transmits/receives information with another computer, for example, a computer installed in a Pachinko hall (a Pachinko parlor) or a casino hall, another game machine, and the like. As information for transmission/reception, for example, there is information regarding sales in the game machine.

Figure 3:
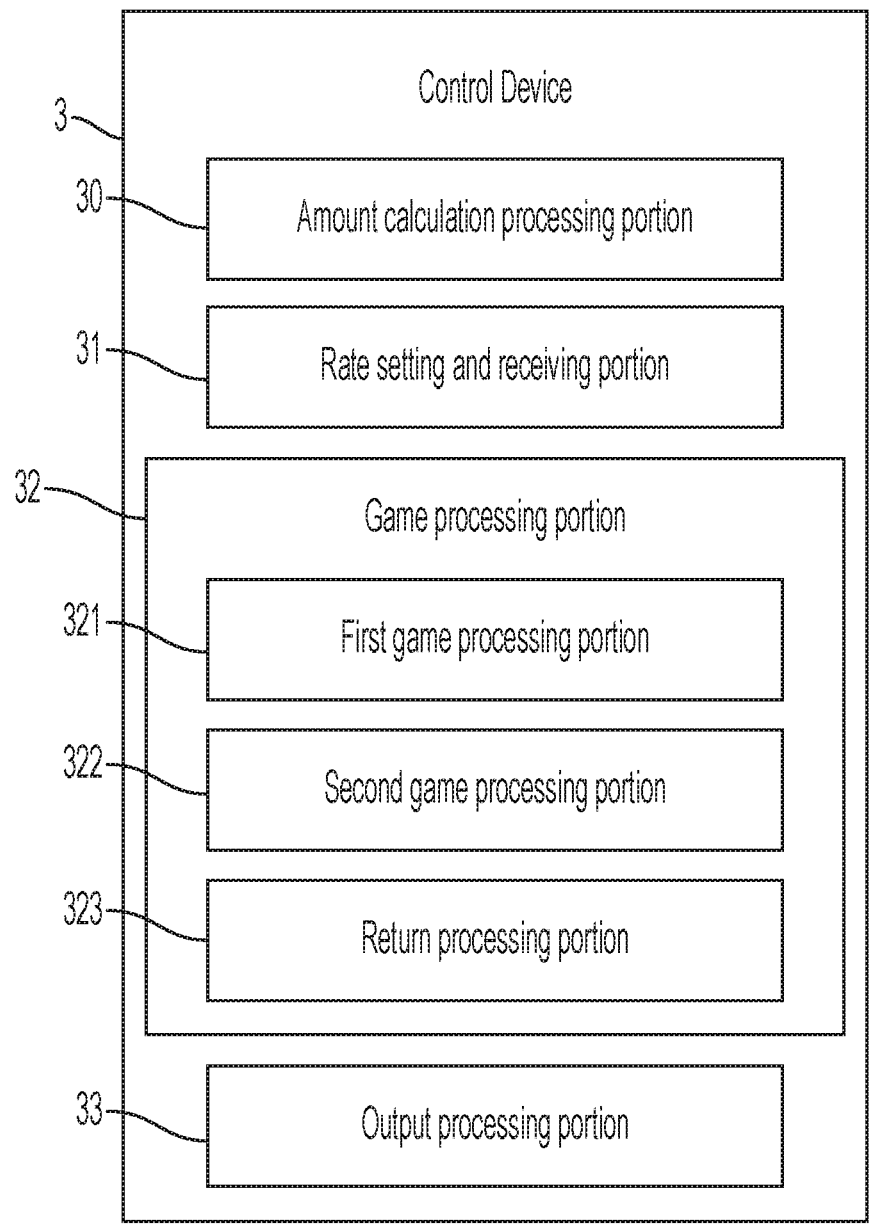
FIG. 3 is a drawing schematically showing one example of a processing function of the control device which the game machine includes according to the present invention.
Figure 4:
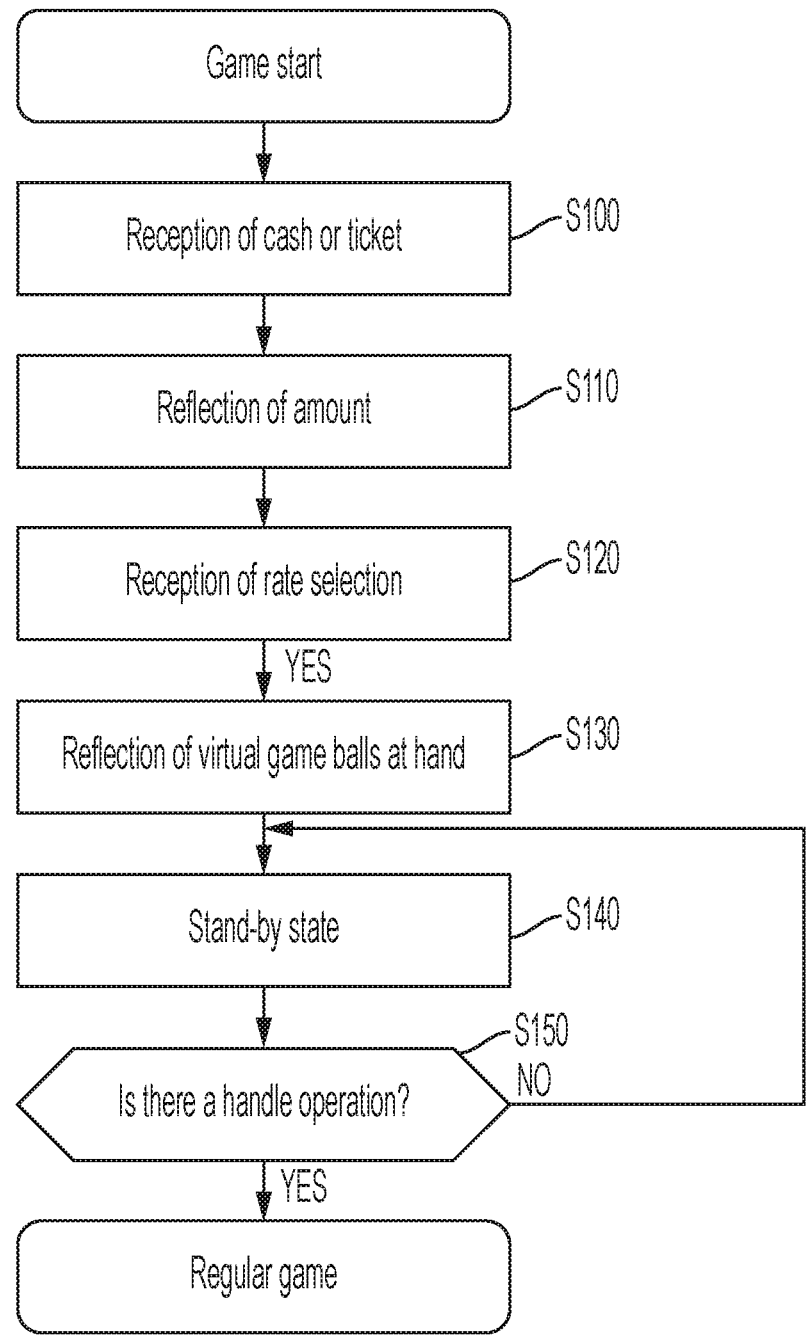
FIG. 4 is a flowchart showing one example of processing before a game starts, at a time that the game ends, and the like in the game machine according to the present invention.
Figure 5:
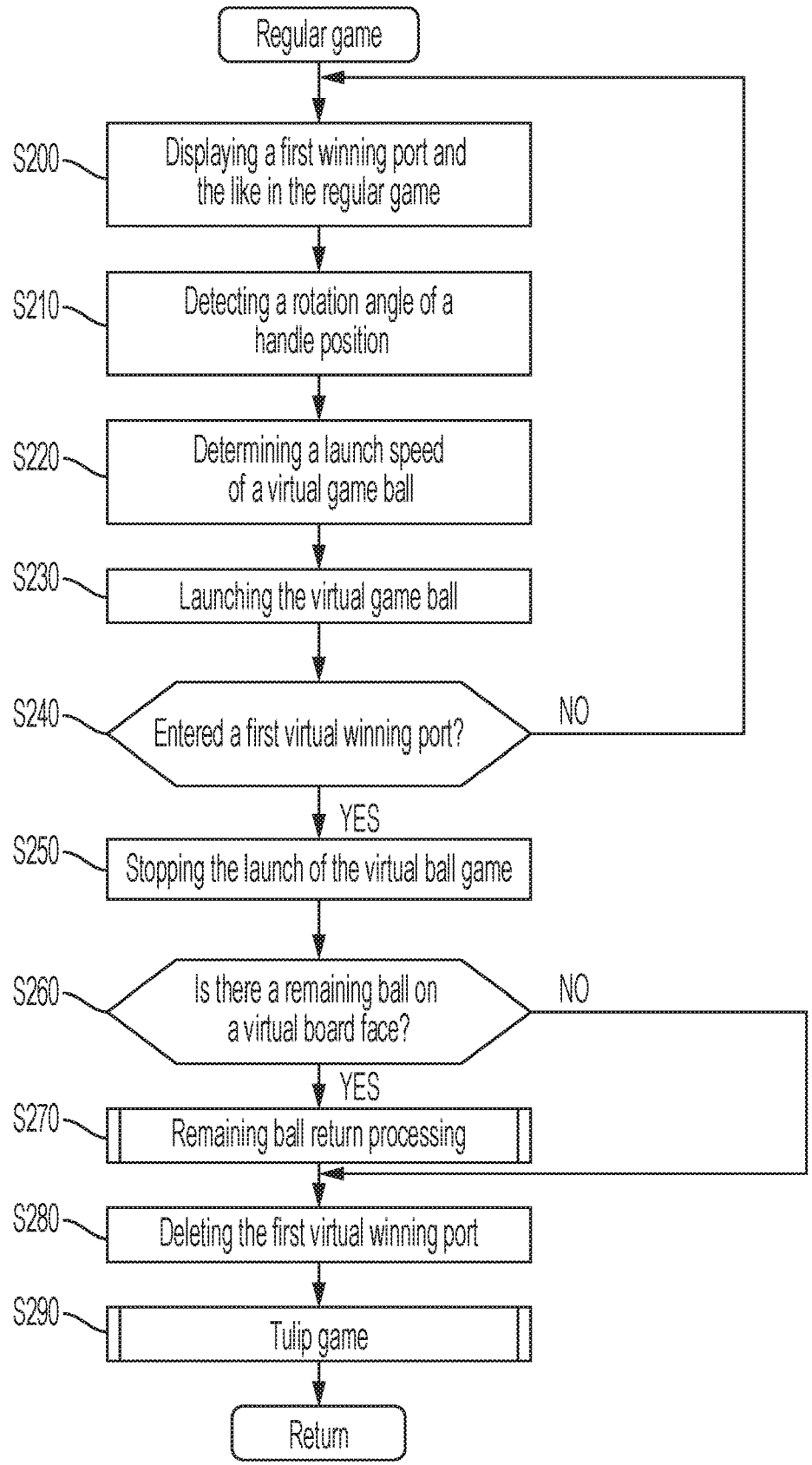
FIG. 5 is flowchart showing one example of processing in a regular game in the game machine according to the present invention.
Figure 6:
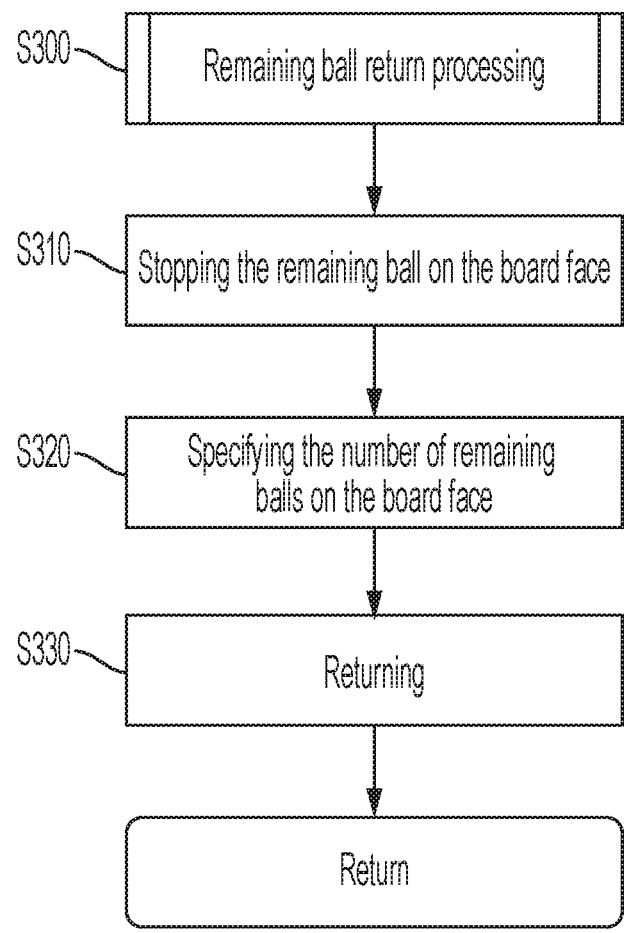
FIG. 6 is a flowchart showing one example of return processing in the game machine according to the present invention.
Figure 7:
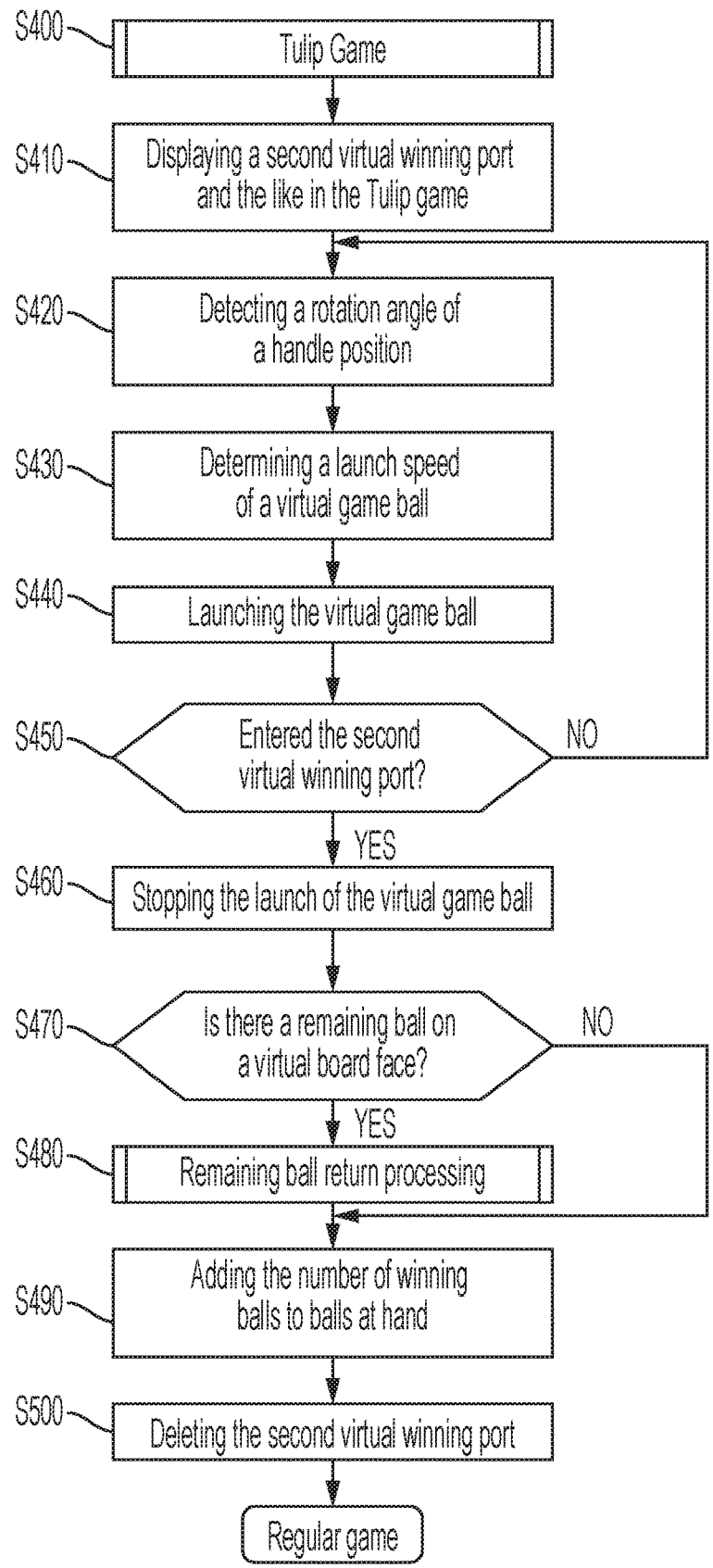
FIG. 7 is a flowchart showing one example of processing in a Tulip game in the game machine according to the present invention.

A structure of each function in the control device is shown in FIG. 3. The control device 3 comprises an amount calculation processing portion 30 for performing the control processing of the digital Pachinko; a rate setting and receiving portion 31; a game processing portion 32; and an output processing portion 33.

The amount calculation processing portion 30 calculates the amount based on the information of the money amount input or inserted based on the coin input into the coin input port or the paper money inserted into the paper-money insertion port specified in the amount calculation device 2. Incidentally, a currency used in the amount may be an optional currency.

The rate setting and receiving portion 31 receives the information of the exchange rate of the virtual game balls 208 selected in the rate selection buttons 5a to 5d which are the rate selection portion. The exchange rate can be set appropriately.

The game processing portion 32 performs processing of carrying out the computer simulation of the mechanical-type Pachinko machine. The game processing portion 32 comprises a first game processing portion 321, a second game processing portion 322, and a return processing portion 323. In the game processing portion 32 of the present invention, when the processing of carrying out the computer simulation of the mechanical-type Pachinko machine is performed, the processing with two kinds of modes of the processing (the first game processing portion 321) of a regular game and the processing (the second game processing portion 322) of a Tulip game is performed; however, it is not limited to the above, and may reproduce the board face of the mechanical-type Pachinko machine. The regular game is the game mode for transitioning to the Tulip game, and the virtual game ball 208 enters a first virtual winning port 205 so as to transit to the Tulip game. The Tulip game is the game mode for acquiring winning balls, and the virtual game ball 208 enters a second virtual winning port 207, so that a player can acquire the winning balls and/or the credit or the amount corresponding to that.

Also, the game processing portion 32 calculates the number (the credit) of virtual game balls 208 based on the information of the amount calculated in the amount calculation processing portion 30 and the information of the exchange rate received in the rate setting and receiving portion 31. For example, in a case wherein the information of the exchange rate of 0.2 Hong Kong dollar per one ball is selected in the rate selection portion (the rate selection buttons 5a to 5d), and the amount is 1,000 Hong Kong dollars, the game processing portion 32 calculates 5,000 balls as the number of virtual game balls 208 at hand. Also, in a case wherein there is the number of virtual game balls 208 at hand beforehand, and a new amount is added, the new number of virtual game balls 208 (the number of balls at hand) is calculated by adding the number of virtual game balls 208 already stored to the number of virtual game balls 208 to be added which is calculated based on the added amount and the exchange rate. Incidentally, in a case wherein the selection of the rate selection buttons 5a to 5d which are the rate selection portion is carried out on a middle of the regular game or the Tulip game, according to the amount at that time, the number of balls at hand is calculated based on the exchange rate of the selected rate so as to be changed.

Figure 8:
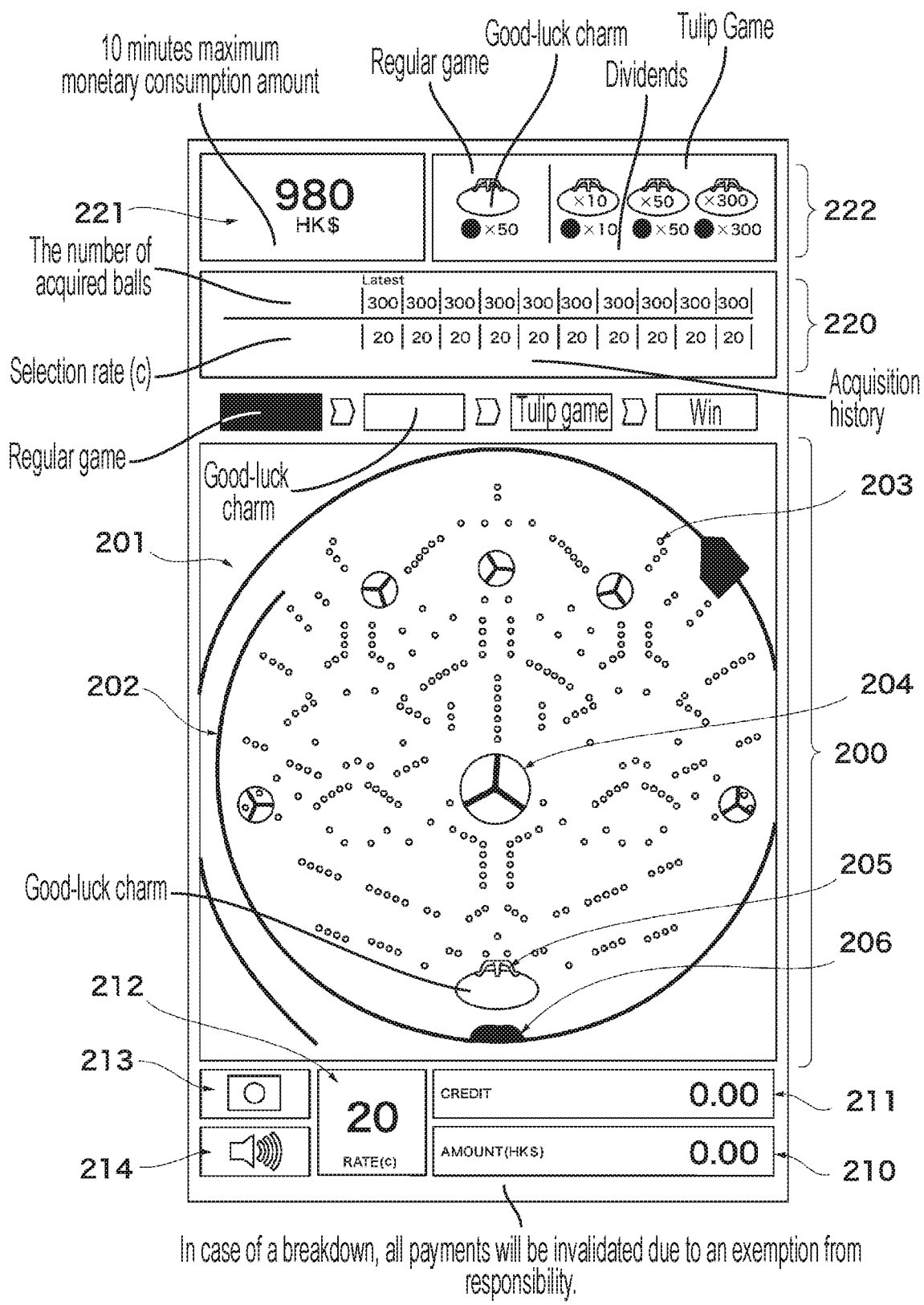

In processing the first game processing portion 321 in the regular game, the display device D displays the virtual board face 201; an arbitrary number of virtual nails 203 (nails on the board face of the mechanical-type Pachinko machine are virtually displayed) which change a movement route of the virtual game balls 208, and a virtual pinwheel 204 (a pinwheel on the board face of the mechanical-type Pachinko machine is virtually displayed); at least one or more first virtual winning port or ports 205 (a parent pocket); and an virtual out port 206. In the regular game in the first game processing portion 321, as the virtual winning port, it is preferable to display the first virtual winning port 205 for transitioning to the Tulip game in the later-described second game processing portion 322, and it is preferable not to display the second virtual winning port 207. Also, it is preferable to have one first virtual winning port 205; however, a plurality of first virtual winning ports 205 may be displayed. Furthermore, in a case wherein the virtual game ball 208 enters the first virtual winning port 205, the number of virtual game balls 208 set in the first virtual winning port 205 may be capable of being acquired as the winning balls. FIG. 8 schematically shows one example of a screen wherein the first game processing portion 321 makes the display device D display. In the screen in FIG. 8, there are displayed a game area 200; an amount display area 210; a credit display area 211; a selection rate display area 212; a selected language display area 213; a sound output selection area 214; an acquisition history display area 220; a maximum-monetary-consumption-amount display area 221; and a dividend display area 222.

The game area 200 is the area performing the game by the digital Pachinko, and in the game area 200, there are displayed the virtual board face 201; a virtual rail 202; the virtual nails 203; the virtual pinwheels 204; the first virtual winning port 205 displayed at a time of the regular game; the second virtual winning port 207 displayed at a time of the Tulip game; the virtual out port 206; and the like for performing the digital Pachinko. The amount display area 210 is the area displaying the amount calculated in the amount calculation processing portion 30. The credit display area 211 is the area displaying the credit which is the number of virtual game balls 208 at hand calculated in the game processing portion 32 based on the amount and the exchange rate. The selection rate display area 212 is the area displaying the exchange rate between the amount and the virtual game balls 208 selected by the rate selection buttons 5a to 5d and received in the rate setting and receiving portion 31. The selected language display area 213 displays a language used when the display device D displays. The language used for a display is switchable in an optional method, and for example, according to pressing down of the button 5f, the language may be changed in order. As selectable languages, there are provided Japanese, English, Chinese (Mandarin and Cantonese), Portuguese, and the like as examples. The sound output selection area 214 is the area visualizing and displaying the volume of sound (the volume) of the speakers SP provided in the housing 1. For example, every time the button 5g is pressed down, the volume of sound is switched sequentially at three stages of small, middle, and large, and according to each stage, a graphic of the sound output selection area 214 lights one line, two lines, and three lines sequentially.

The acquisition history display area 220 is the area displaying the history of the number of virtual game balls 208 acquired as the winning balls in the game (usually, the Tulip game) by the digital Pachinko, and the information of the exchange rate selected at that time. The maximum-monetary-consumption-amount display area 221 is the area displaying the amount consuming at the maximum per unit time. The maximum-monetary-consumption-amount display area 221 displays a maximum monetary consumption amount per unit time calculated using the maximum number of balls for the virtual game balls 208 launchable per unit time, the selected exchange rate, and a base. The base is the number of winning balls acquirable when 100 virtual game balls 208 are launched during the regular game, and for example, in a case wherein the number of winning balls acquirable when 100 virtual game balls 208 are launched is 30 balls, the base becomes "30". Incidentally, the number of winning balls acquirable as the base is not guaranteed, and it just has to be an indicator based on a set value, an experience value, an average value in past games, and the like.

The maximum monetary consumption amount can be calculated by, the maximum monetary consumption amount=the maximum number of virtual game balls launchable per unit time×the selected exchange rate× (100−base) %.

For example, in a case wherein the base is 30; 70 balls of virtual game balls 208 can be launched per minute; a unit time is 10 minutes; and the selected exchange rate is set as 2.0 Hong Kong dollar per one ball, the number of virtual game balls 208 launchable per 10 minutes at the maximum is 700 balls so as to calculate 980 Hong Kong dollars (=70 balls×10 minutes×2.0 Hong Kong dollar×(100−30) %) as the maximum monetary consumption amount, and it is displayed in the maximum-monetary-consumption-amount display area 221.

Incidentally, as the maximum monetary consumption amount, the base may be considered, or without considering the base, the maximum monetary consumption amount may be calculated by multiplying the maximum number of virtual game balls 208 launchable per unit time and the selected exchange rate.

Furthermore, in the game processing portion 32, for the convenience of a player, in a case wherein the virtual board face 201 displays an area (a guide area) to be aimed at by launching virtual game balls 208, a minimum value of respective bases in a case wherein the virtual game balls 208 reach the guide area thereof may be used at a time of the calculation of the maximum monetary consumption amount. Namely, it may be calculated as, the maximum monetary consumption amount=the maximum number of virtual game balls launchable per unit time×the selected exchange rate× (100−(the minimum value of the base of the guide area displayed on the virtual board face)) %.

Additionally, the minimum value of the base on the virtual board face 201 may be used. Namely, it may be calculated as, the maximum monetary consumption amount=the maximum number of virtual game balls 208 launchable per unit time×the selected exchange rate×(100−(the minimum value of the base on the virtual board face)) %.

Incidentally, as a display mode different from the maximum-monetary-consumption-amount display area 221, it may be an area displaying the amount set as an amount consumable in a given time. In that case, the game processing portion 32 starts time measuring by a start of the game, monitors the time measuring and the consumed amount, and determines whether the consumed amount does not exceed the amount set in the given time. Then, in a case wherein the consumed amount exceeds the amount set in the given time, the game processing portion 32 performs a control of stopping the game. Incidentally, the amount consumable in the given time may be set by input by a player, or it may be set by a store beforehand, or it may be set by initial setting in the game machine.

The dividend display area 222 is the area displaying the number of virtual game balls 208 (a dividend) that the player can acquire as the winning balls by entering the virtual game balls 208 into the first virtual winning port 205 (the parent pocket) or the second virtual winning port 207 (a child pocket) at the time of the later-described regular game in the first game processing portion 321, or Tulip game in the second game processing portion 322.

The first game processing portion 321 determines a launch speed of the virtual game balls 208 by a detection of the rotation angle by a rotation operation of the handle 4 of the game machine, and launches the virtual game balls 208. When a virtual game ball 208 is launched onto the virtual board face 201, the number of balls at hand is subtracted by one, and the number of balls at hand displayed in the credit display area 211 is reduced by one. Also, according to the number of launched virtual game balls 208, the amount to be displayed in the amount display area 210 is subtracted and displayed. For example, in a case wherein the exchange rate is 0.2 Hong Kong dollar, and the amount is 1,000 Hong Kong dollars, the amount is subtracted by 0.2 Hong Kong dollar by launching one virtual game ball 208 so as to display as 999.80 Hong Kong dollar.

The virtual game balls 208 move along the virtual rail 202 based on a determined launch speed, and move in such a way so as to fall downward from an upper side on the virtual board face 201. Incidentally, a movement of the virtual game ball 208 on the virtual board face 201 can be achieved by calculating a position coordinate on the virtual board face 201 of the virtual game ball 208 based on a known calculation formula. Then, when the virtual game ball 208 hits the virtual nail 203, the virtual pinwheel 204, or the like (the position coordinate of the virtual game ball 208 comes to be within a prescribed range from the position coordinate of the virtual nail 203 or the virtual pinwheel 204), the virtual game ball 208 reflects, and a moving direction changes. A reflection or a moving direction changing processing of the virtual game ball 208 when the virtual game ball 208 hits the virtual nail 203, the virtual pinwheel 204, or the like can be calculated by the known calculation formula.

When the virtual game ball 208 enters the first virtual winning port 205 (the position coordinate of the virtual game ball 208 comes to be within the prescribed range from the position coordinate of the winning port) while falling downward from the upper side on the virtual board face 201 displayed in the display device D, it moves to the later-described processing in the Tulip game in the second game processing portion 322. Incidentally, the virtual game ball 208 enters the first virtual winning port 205, so that the first game processing portion 321 provides the winning ball. Namely, the first game processing portion 321 stores the situation by adding the number of virtual game balls 208 acquired as the winning balls to the number of balls at hand displayed in the credit display area 211. Also, the first game processing portion 321 stores the situation by adding the amount to be obtained by multiplying the exchange rate to the number of virtual game balls 208 acquired as the winning balls to the amount displayed in the amount display area 210. For example, when the exchange rate is 0.2 Hong Kong dollar, the amount is 1,000 Hong Kong dollars, and the number of virtual game balls 208 acquired as the winning balls is 50, 50 is multiplied by 0.2 Hong Kong dollar, and added to the amount of 1,000 Hong Kong dollars. Namely, 1,010 Hong Kong dollars are stored as the new amount.

Figure 9:
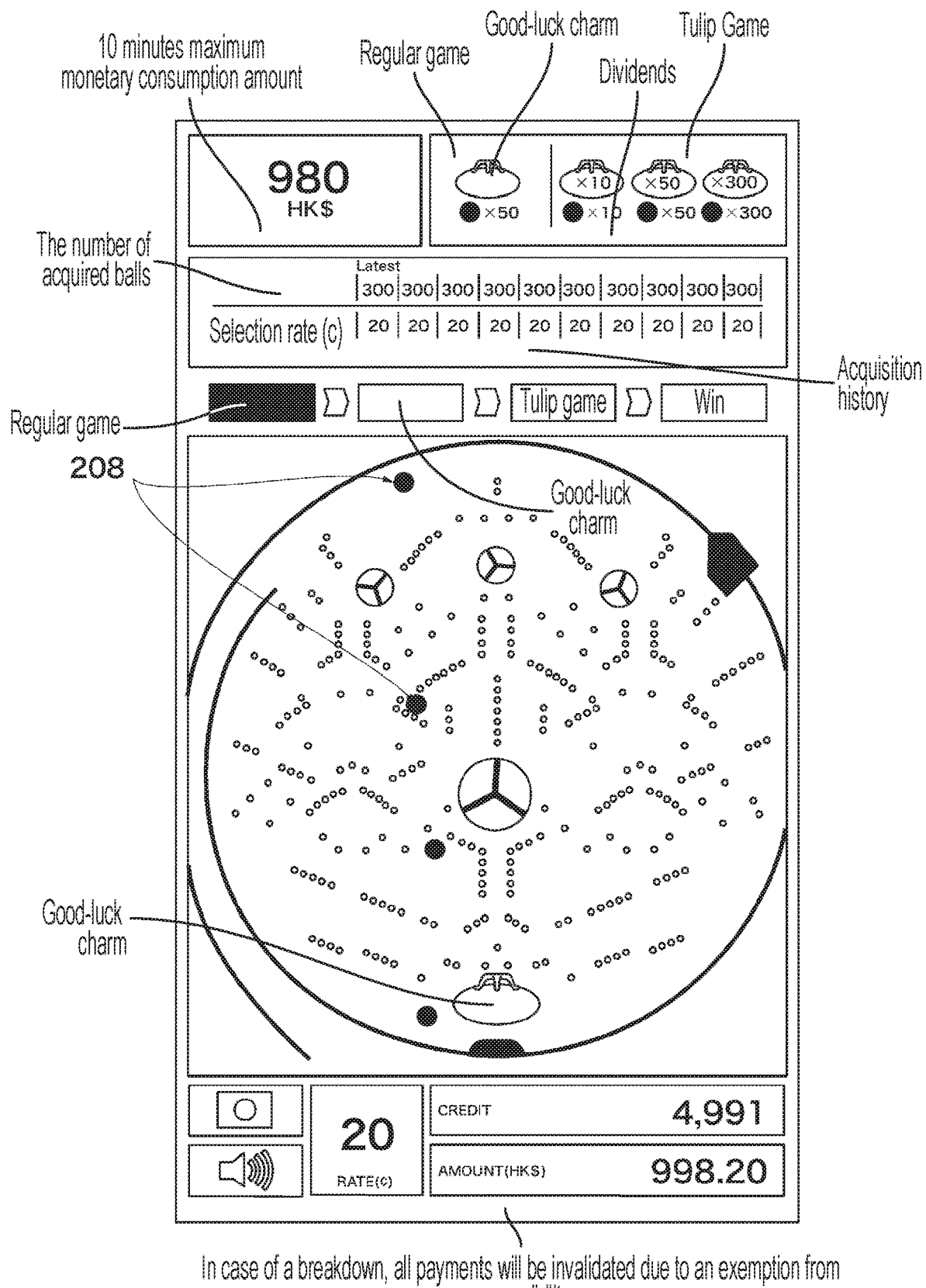
FIG. 9 is one example of a screen in a state after virtual game balls are launched onto a virtual board face in the regular game.
Figure 10:
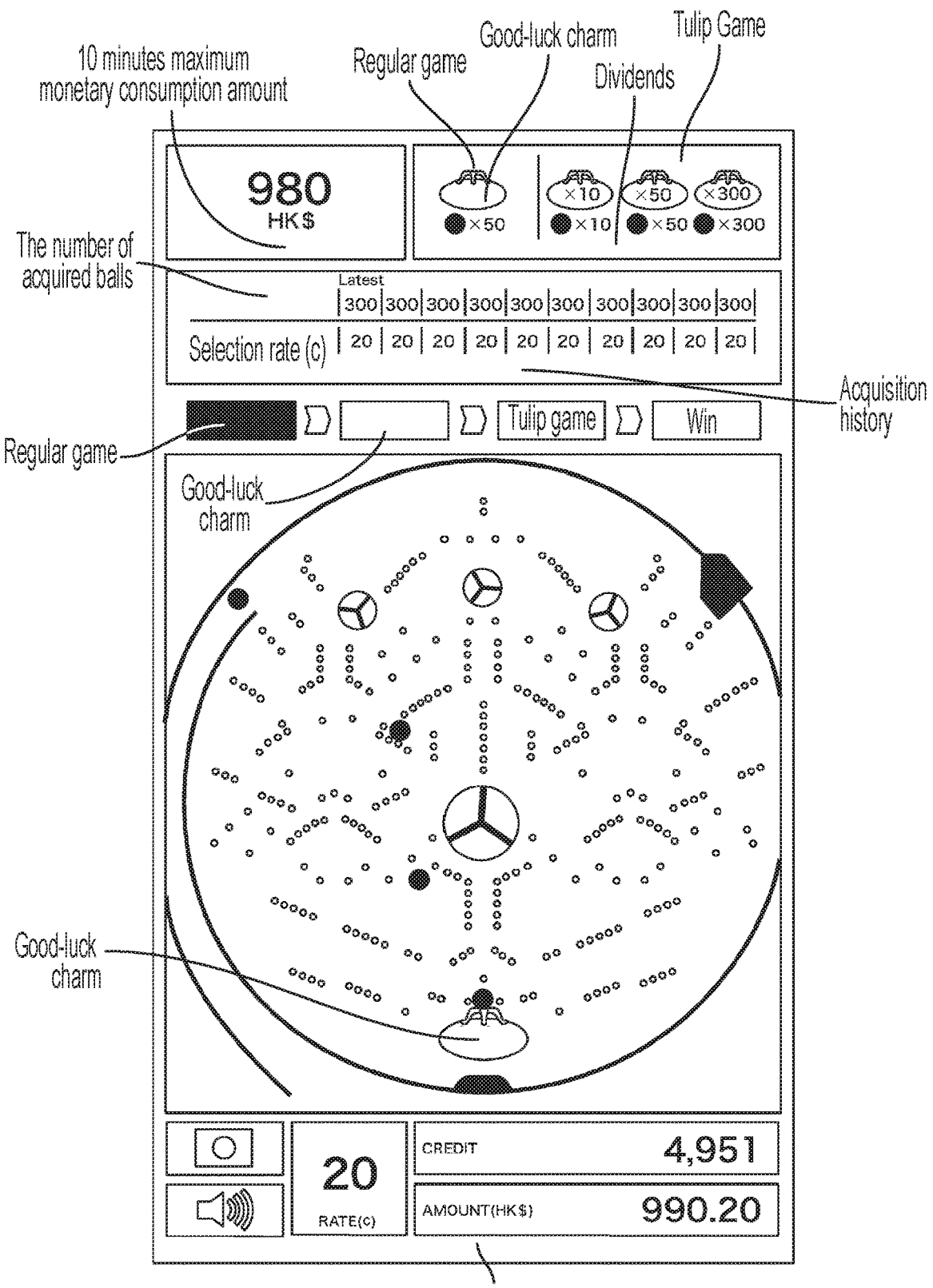
FIG. 10 is one example of a screen in a state immediately before the virtual game ball enters a first virtual winning port in the regular game.
Figure 11:
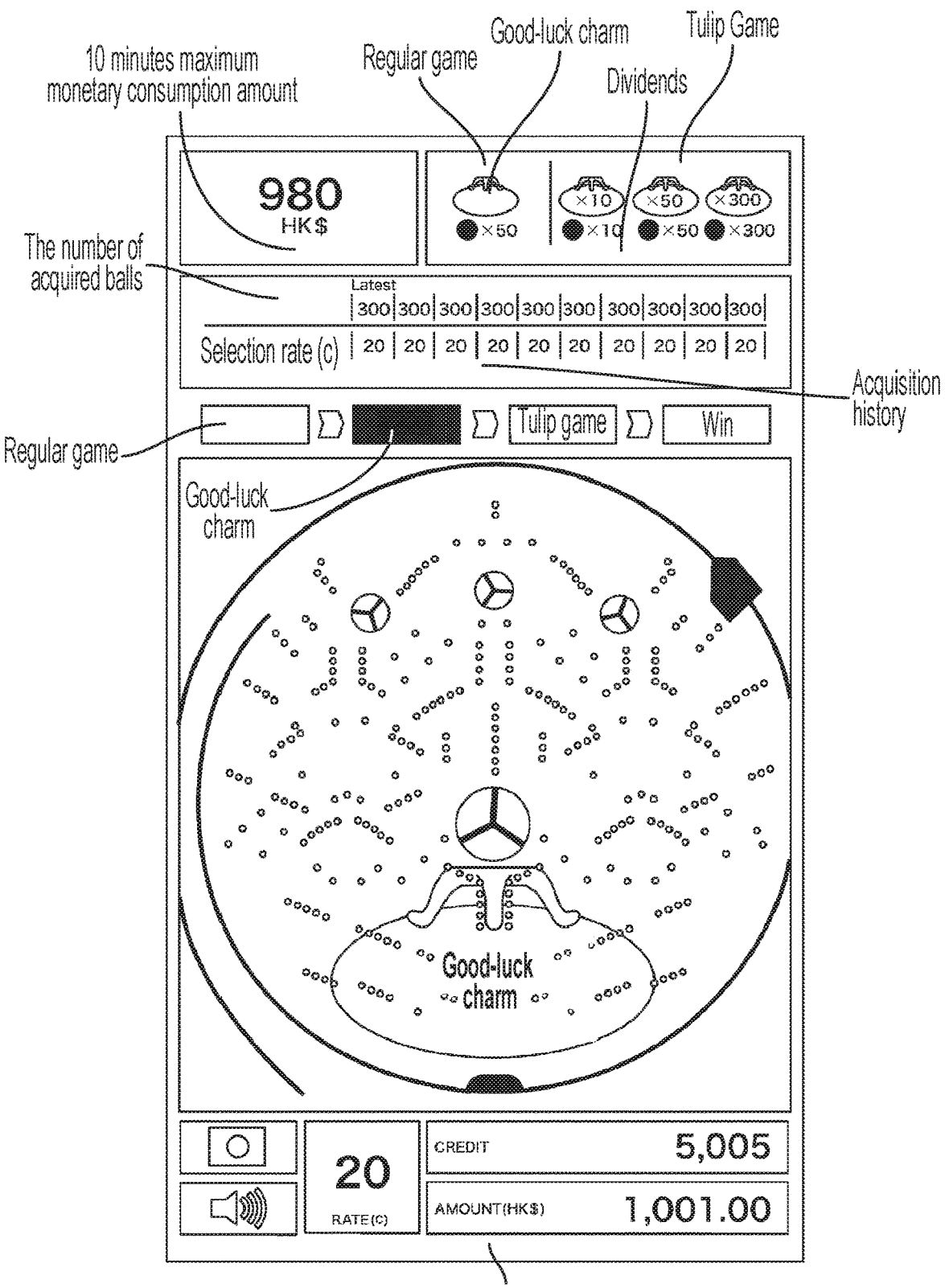
FIG. 11 is one example of a screen in a state wherein the virtual game ball has entered the first virtual winning port in the regular game.

When the virtual game ball 208 reaches a lower side of the virtual board face 201 without entering the first virtual winning port 205, the virtual game ball 208 moves to the virtual out port 206 directly, and the virtual game ball 208 thereof is deleted from the virtual board face 201, and is collected. FIG. 9 schematically shows a state wherein the virtual game balls 208 are moving downward from the upper side on the virtual board face 201. Also, FIG. 10 schematically shows a state immediately before the virtual game ball 208 enters the first virtual winning port 205. FIG. 11 schematically shows a state immediately after the virtual game ball 208 enters the first virtual winning port 205.

Figure 12:
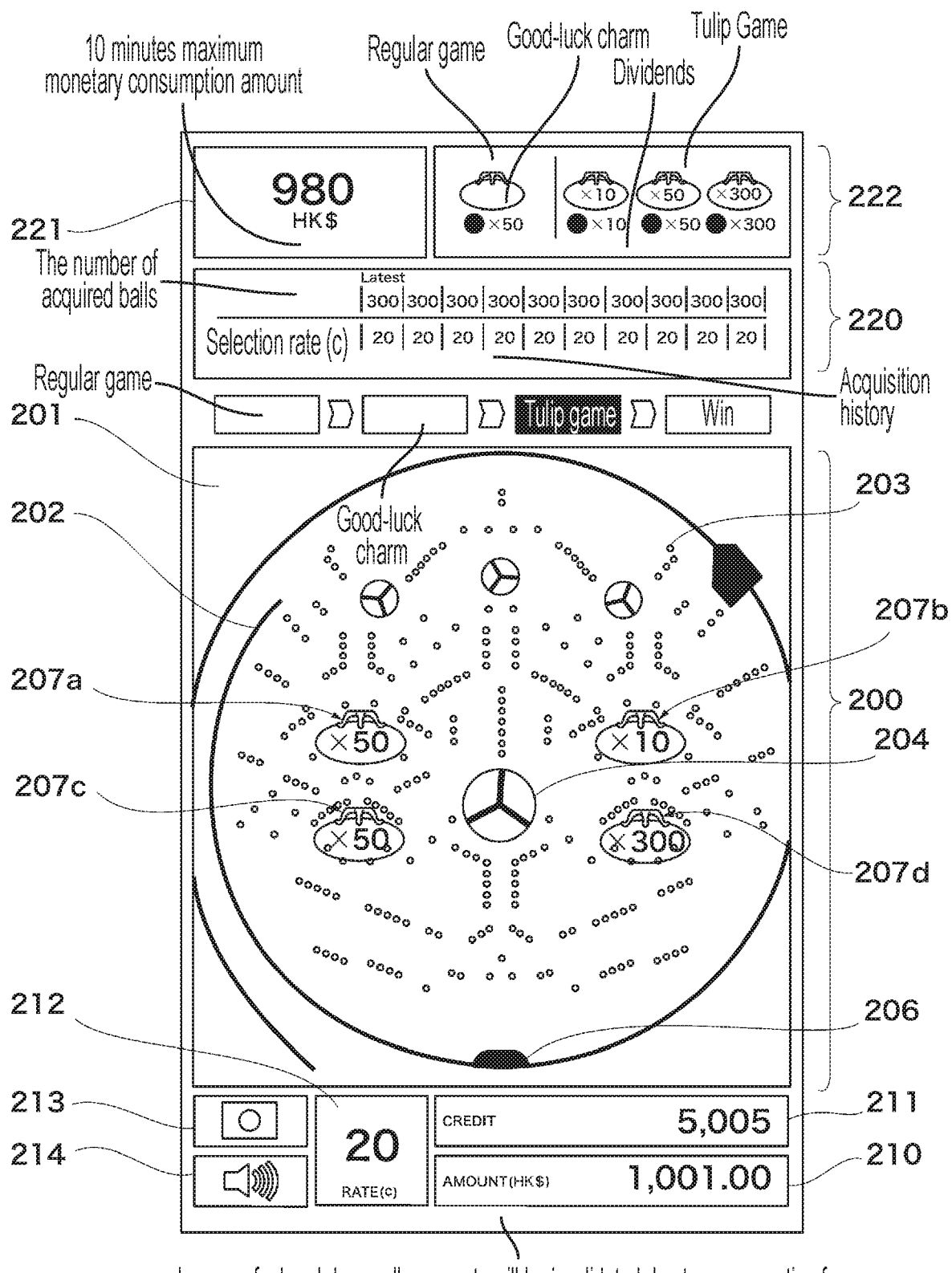
FIG. 12 is one example of a screen in a state before the virtual game ball is launched onto the virtual board face in the Tulip game.

In processing the Tulip game in the second game processing portion 322, in the display device D, there are displayed the virtual board face 201 of a Pachinko machine, the arbitrary number of virtual nails 203 or the virtual pinwheel 204 changing a route of the virtual game balls 208; at least one or more second virtual winning port or ports 207 (the child pocket); and the virtual out port 206. FIG. 12 schematically shows one example of a screen wherein the second game processing portion 322 displays in the display device D. The screen in FIG. 12 is nearly similar to the screen wherein the first game processing portion 321 displays in the display device D, and there are displayed the game area 200; the amount display area 210; the credit display area 211; the selection rate display area 212; the selected language display area 213; the sound output selection area 214; the acquisition history display area 220; the maximum-monetary-consumption-amount display area 221; and the dividend display area 222. The screen displayed by the second game processing portion 322 displays the information similar to the first game processing portion 321 except for the game area 200 as well.

The game area 200 in the second game processing portion 322 is the area performing the game by the Pachinko machine, and in the game area 200, there are displayed the virtual board face 201; the virtual rail 202; the virtual nails 203; the virtual pinwheel 204; the second virtual winning port 207; the virtual out port 206; and the like for performing Pachinko. In the second virtual winning port 207, when the virtual game ball 208 enters the second virtual winning port 207, the number of virtual game balls 208 set per the second virtual winning port 207 beforehand can be acquired as the winning balls. For example, in FIG. 12, four second virtual winning ports 207 are displayed, and there are displayed second virtual winning ports 207a and 207c where 50 winning balls can be acquired; a second virtual winning port 207b where 10 winning balls can be acquired; and a second virtual winning port 207d where 300 winning balls can be acquired. The number of acquirable winning balls (the virtual game balls 208) can be set arbitrarily. The number of second virtual winning ports 207 can be set arbitrarily as well.

As with the first game processing portion 321, the second game processing portion 322 determines the launch speed of the virtual game balls 208 by the detection of the rotation angle by the rotation operation of the handle 4 of the game machine, and launches the virtual game balls 208. When a virtual game ball 208 is launched onto the virtual board face 201, the number of balls at hand is subtracted by one, and the number of balls at hand displayed in the credit display area 211 is reduced by one. Also, according to the number of launched virtual game balls 208, the amount to be displayed in the amount display area 210 is subtracted and displayed. For example, in the case wherein the exchange rate is 0.2 Hong Kong dollar, and the amount is 1,000 Hong Kong dollars, the amount is subtracted by 0.2 Hong Kong dollar by launching one virtual game ball to thereby display as 999.80 Hong Kong dollars.

The virtual game ball 208 moves along the virtual rail 202 based on the determined launch speed, and moves in such a way so as to fall downward from the upper side on the virtual board face 201. Then, when the virtual game ball 208 hits the virtual nail 203, the virtual pinwheel 204, or the like (the position coordinate of the virtual game ball 208 comes to be within the prescribed range from the position coordinate of the virtual nail 203 or the virtual pinwheel 204), the virtual game ball 208 reflects, and the moving direction changes. When the virtual game ball 208 enters a second virtual winning port 207 (the position coordinate of the virtual game ball 208 comes to be within the prescribed range from the position coordinate of the winning port) while falling downward from the upper side on the virtual board face 201 displayed in the display device D, the number of virtual game balls 208 set in the second virtual winning port 207 thereof beforehand can be acquired as the winning ball. Therefore, the second game processing portion 322 stores the situation by adding the number of virtual game balls 208 acquired as the winning balls to the number of balls at hand displayed in the credit display area 211. Also, the second game processing portion 322 stores the situation by adding the amount to be obtained by multiplying the exchange rate to the virtual game balls 208 acquired as the winning balls to the amount displayed in the amount display area 210. For example, when the exchange rate is 0.2 Hong Kong dollar, the amount is 1,000 Hong Kong dollars, and the number of virtual game balls 208 acquired as the winning balls is 10, 10 is multiplied by 0.2 Hong Kong dollar, and added to the amount of 1,000 Hong Kong dollars. Namely, 1,002 Hong Kong dollars are stored as the new amount.

Figure 13:
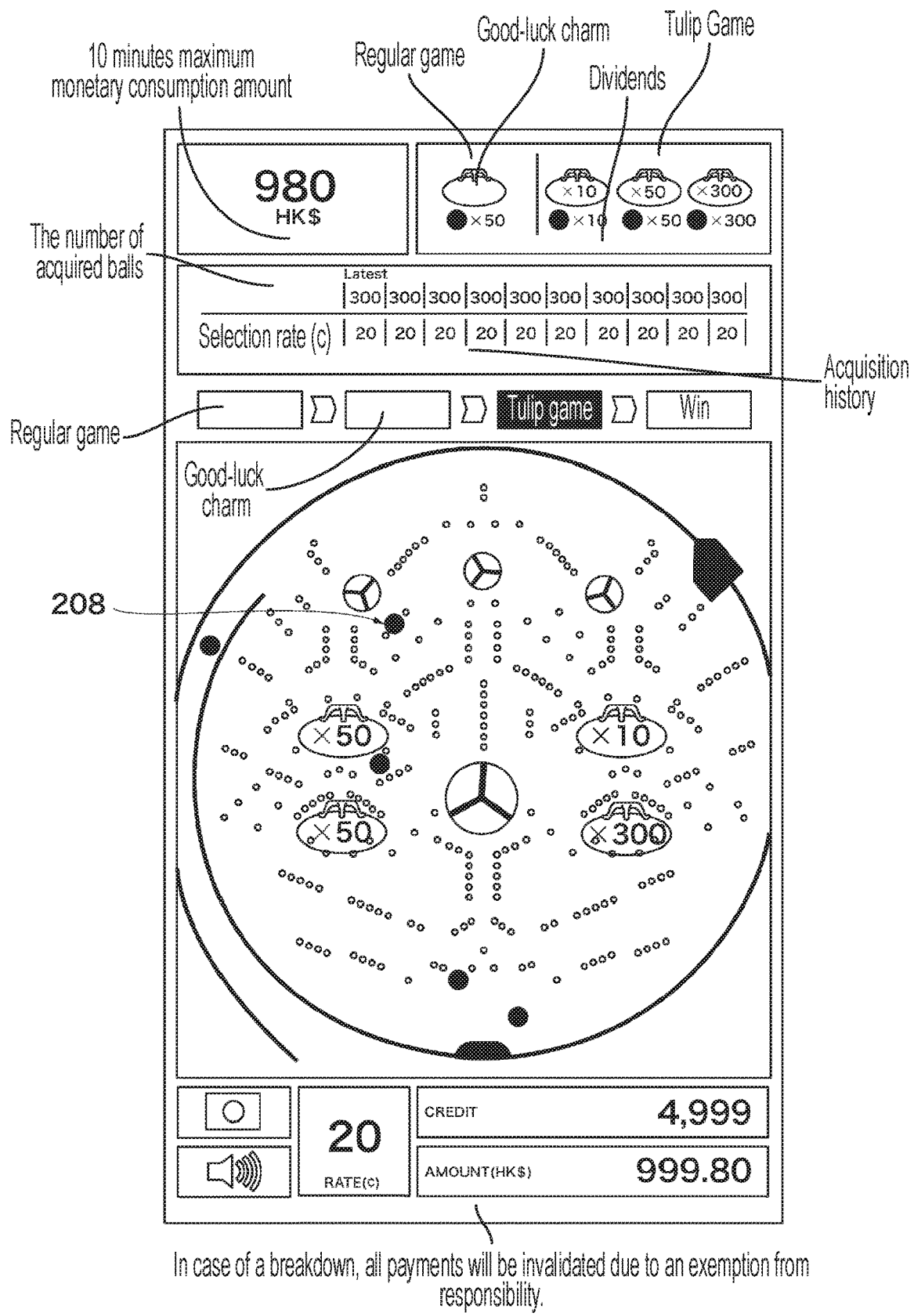
FIG. 13 is one example of a screen in a state after the virtual game balls are launched onto the virtual board face in the Tulip game.
Figure 14:
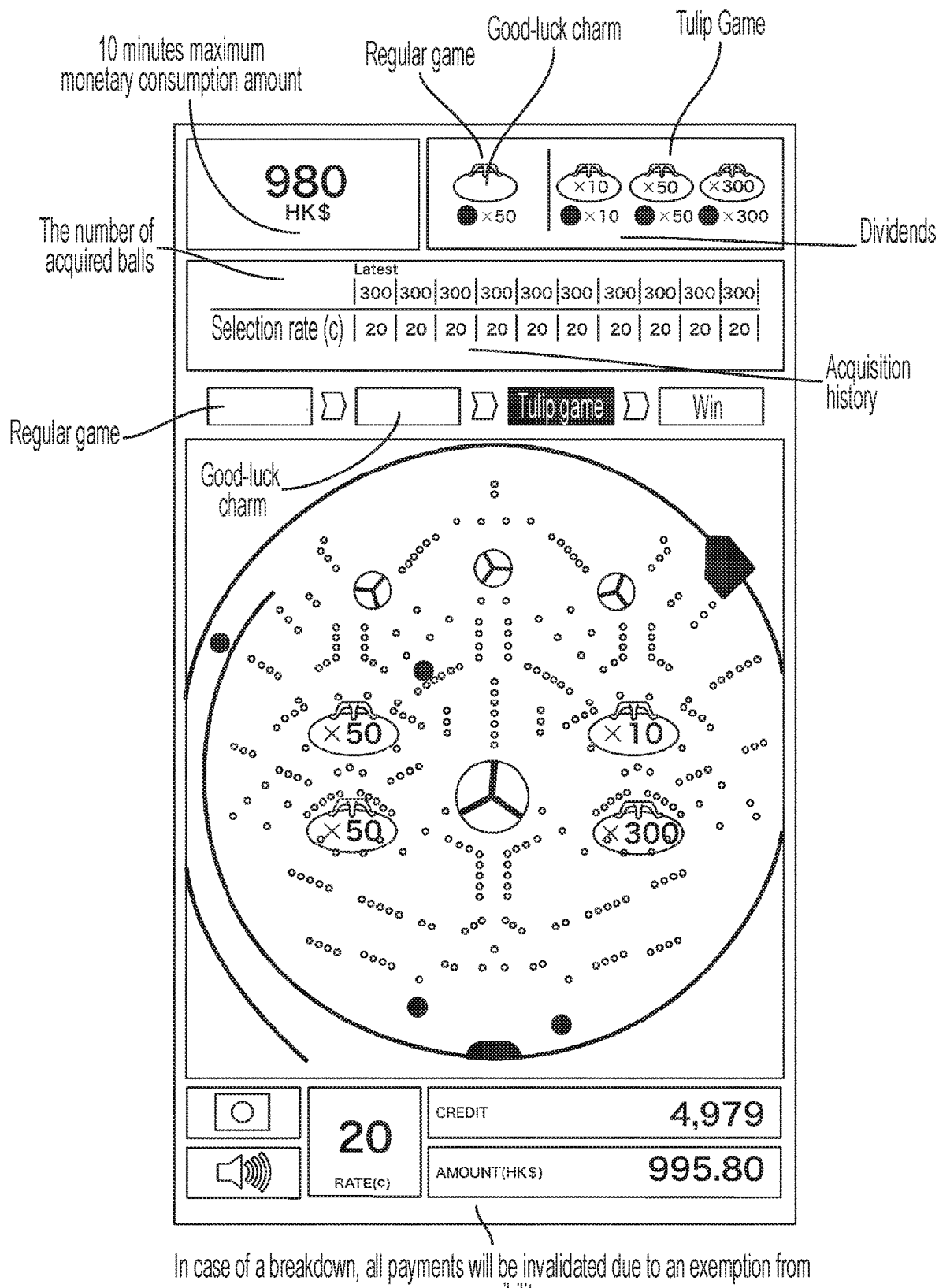
FIG. 14 is one example of a screen in a state immediately before the virtual game ball enters a second virtual winning port in the Tulip game.
Figure 15:
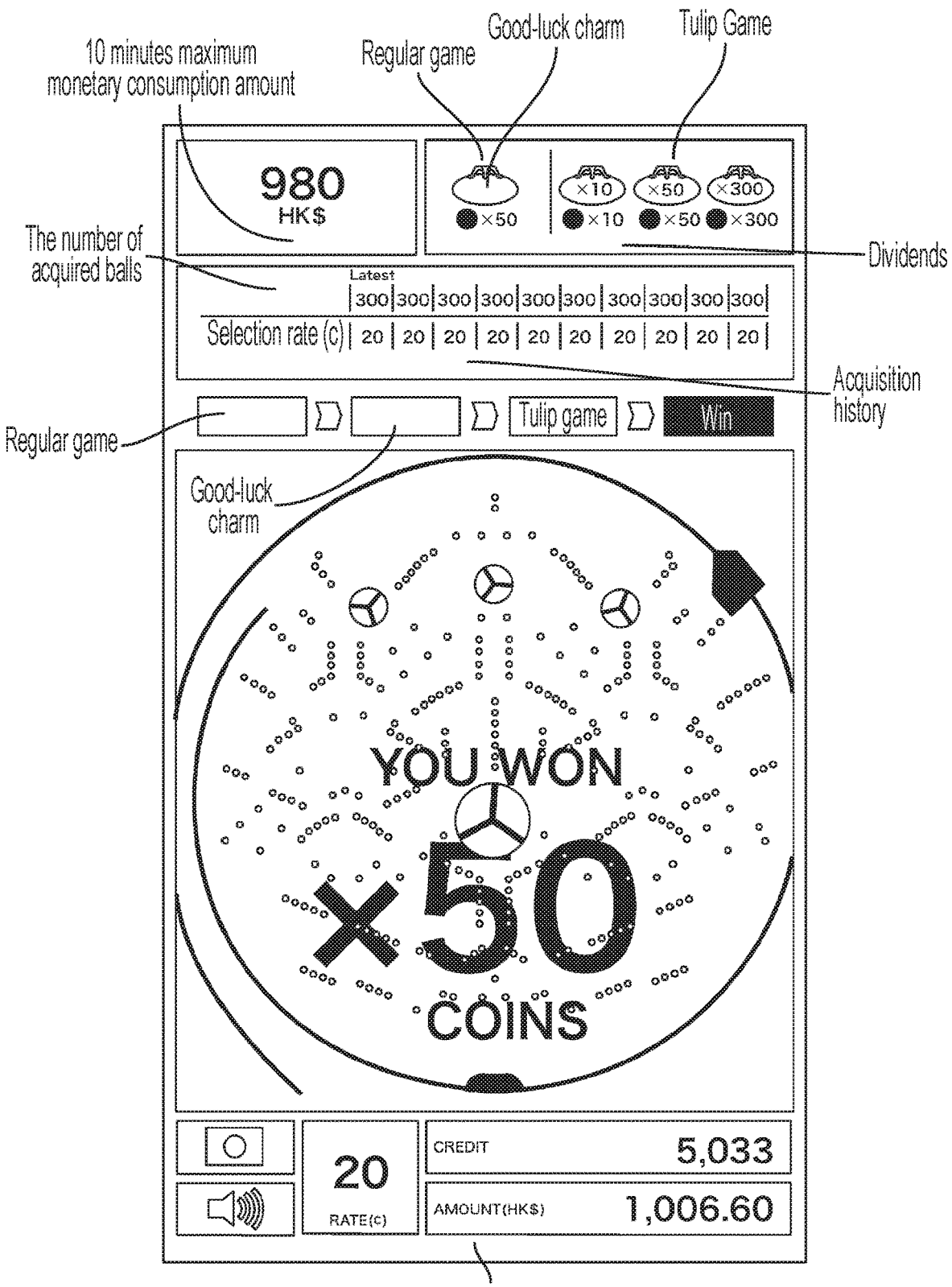
FIG. 15 is one example of a screen in a state wherein the virtual game ball has entered the second virtual winning port.
Figure 16:
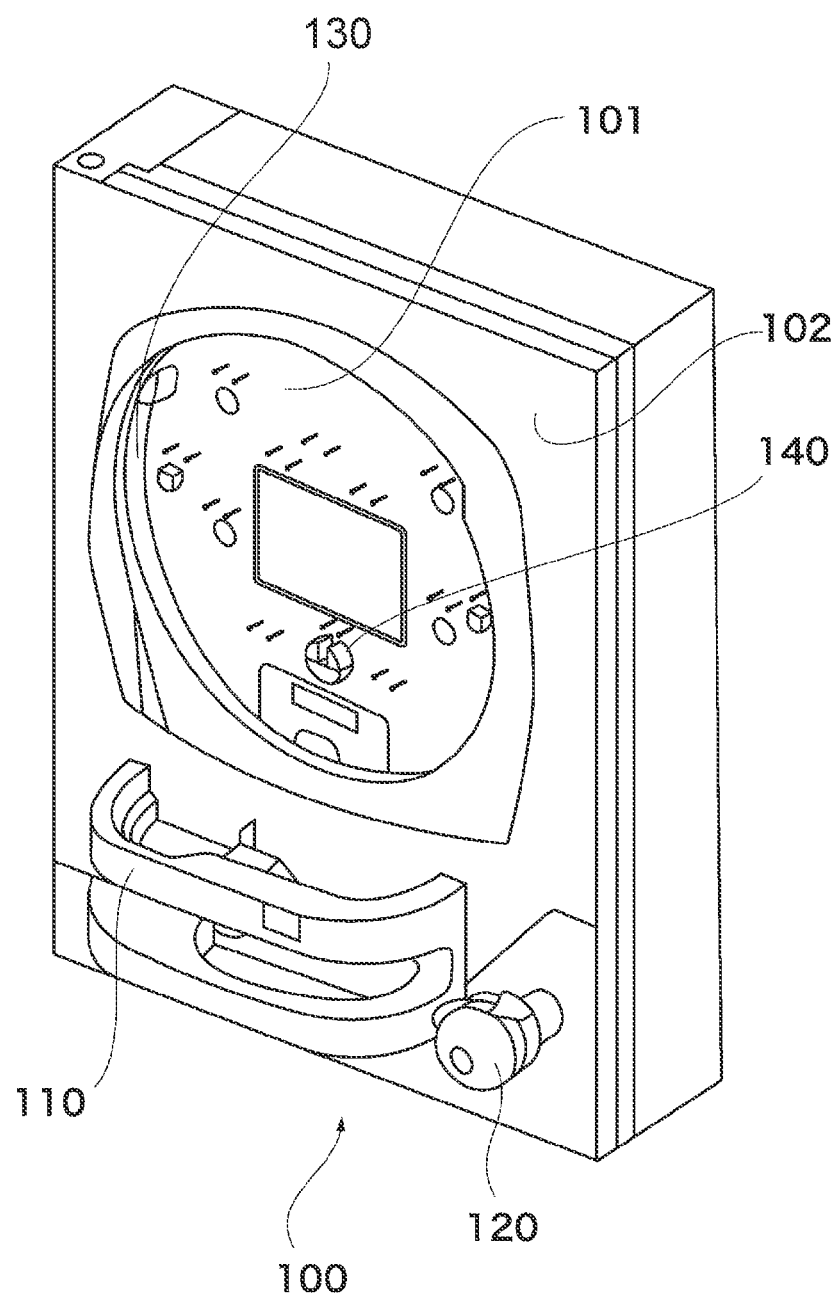
FIG. 16 is a drawing showing one example of a conventional mechanical-type Pachinko machine.

When the virtual game ball 208 reaches the lower side of the virtual board face 201 without entering any second virtual winning ports 207, the virtual game ball 208 moves to the virtual out port 206 directly, and the virtual game ball 208 thereof is deleted from the virtual board face 201, and is collected. FIG. 13 schematically shows a state wherein the virtual game balls 208 are moving downward from the upper side on the virtual board face 201. Also, FIG. 14 schematically shows a state immediately before the virtual game ball 208 enters the second virtual winning port 207. FIG. 15 schematically shows a state immediately after the virtual game ball 208 enters the second virtual winning port 207.

When the virtual game ball 208 enters the first virtual winning port 205 in the first game processing portion 321, and/or when the virtual game ball 208 enters the second virtual winning port 207 in the second game processing portion 322, the return processing portion 323 specifies the number of virtual game balls 208 (remaining balls) remaining on the virtual board face 201, and adds the specified number to the number of virtual game balls 208. Also, the return processing portion 323 calculates the amount corresponding to the specified number of remaining balls, and adds it to the amount displayed in the amount display area 210. Namely, the amount to be obtained by multiplying the exchange rate to the specified number of remaining balls is added to the amount displayed in the amount display area 210 so as to be renewed. When the virtual game ball 208 enters the first virtual winning port 205 or the second virtual winning port 207, the virtual game ball 208 remaining is deleted from the virtual board face 201 once; however, if the virtual game ball 208 is deleted as it is, it is a disadvantage for a player. Consequently, in order to prevent a deletion of the virtual game ball 208, the player comes to hit the next virtual game ball 208 after the player waits until the virtual game ball 208 launched onto the virtual board face 201 enters the first virtual winning port 205 or the second virtual winning port 207, or the virtual out port 206. Then, the player hits the virtual game ball 208 one by one so as to delay a consumption speed of the virtual game ball 208. This means that consumption for the store where the game machine is installed is reduced, so that a business efficiency deteriorates so as not to be a favorable condition. Consequently, for the store, it is preferable that in a state wherein the virtual game ball 208 remains in the virtual board face 201, the player launches the next virtual game ball 208, i.e. launches the virtual game balls 208 continuously. Therefore, in order to obtain the above effect thereof, there is provided return processing of the remaining balls and the amount corresponding to that at the time of winning by the return processing portion 323.

Incidentally, in a case of providing the return processing portion 323, without dividing into the first game processing portion 321 and the second game processing portion 322, in the game processing portion 32, at least one virtual winning port where one or more winning balls can be acquired may be displayed, and in a case wherein the virtual game ball 208 enters there, the number of virtual game balls 208 (the remaining balls) remaining in the virtual board face 201 may be specified, and the specified number may be added to the number of virtual game balls 208. Also, the amount corresponding to the number of specified virtual game balls 208 may be added to the amount displayed in the amount display area 210. In that case, in the game processing portion 32, there may be provided two modes such as the regular game and the Tulip game, or the game may be processed by one mode.

In the output processing portion 33, in a case wherein a player finishes the game of the digital Pachinko, the information of the amount held by the output processing portion is coded by a predetermined method and print processing for outputting from the ticket printer 6 is performed by receiving the pressing down of the button 5f for a ticket out. Incidentally, in a case wherein the information of the amount is stored in an IC chip and the like without coding the information of the amount and outputting from the ticket printer 6 on paper, instead of the ticket printer 6, there is provided a device for transmitting and receiving the information, and by approaching the cellular phone or the IC card to the relevant device, the information of the amount is stored in the IC chip and the like by the contact or noncontact. Incidentally, as the device for transmitting and receiving the information, there may be used the ticket reader as an R/W device, and a device for reading and writing the information may be standardized.

In the output processing portion 33, instead of the amount, the information of the number of virtual game balls 208 and the exchange rate of the virtual game balls thereof may be coded and output.

Next, one example of a process of the processing of the game machine of the present invention will be explained using the flowcharts of FIG. 4 to FIG. 7. One example of the display of the display device D of the game machine before the paper money or the like is inserted is shown in FIG. 8.

In a case wherein the game (the digital Pachinko) is performed in the game machine of the present invention, the paper money is inserted into the paper-money insertion port and the like which is the amount calculation device 2 (S100). Otherwise, the coin is entered into the coin input port which is the amount calculation device 2, or the information regarding a money amount coded and printed in the ticket is read by the ticket reader which is the amount calculation device 2. Here, for example, one sheet of paper money of 1,000 Hong Kong dollars is inserted into the paper-money insertion port.

Based on the information (1,000 Hong Kong dollars) regarding the inputted coin, the inserted paper money or the read amount of money in S100, the amount calculation processing portion 30 in the control device 3 is reflected to the amount as 1,000 Hong Kong dollars, and stores in the storage device 301 (S110). In the aforementioned example, one sheet of the paper money of 1,000 Hong Kong dollars is inserted into the paper-money insertion port, so that the amount calculation processing portion 30 is reflected to the credit as 1,000 Hong Kong dollars.

Then, after the amount is reflected, the rate setting and receiving portion 31 receives the selection of the exchange rate of the virtual game balls selected in the rate selection portion (the rate selection buttons 5a to 5d) (S120). Then, the game processing portion 32 calculates and reflects to the number of virtual game balls 208 at hand based on an exchanging amount and the exchange rate (S130). For example, the amount is 1,000 Hong Kong dollars, and there are four kinds of exchange rates wherein one ball is 0.2 Hong Kong dollar, one ball is 0.6 Hong Kong dollar, one ball is 1.0 Hong Kong dollar, and one ball is 2.0 Hong Kong dollars. In a case wherein the rate selection button 5a of the exchange rate indicating that one ball is 0.2 Hong Kong dollar is pressed down, the rate setting and receiving portion 31 receives the information of the exchange rate thereof, and based on the information thereof, the game processing portion 32 makes the storage device 301 reflect to have 5,000 balls of virtual game balls 208 as the balls at hand.

Incidentally, in the rate setting and receiving portion 31, by receiving the pressing down of the rate selection buttons 5a to 5d at an arbitrary timing including during a game, the game processing portion 32 can appropriately calculate and reflect the number of virtual game balls 208 at hand according to the exchange rate of the virtual game balls where the selection is received. Namely, the game processing portion 32 specifies the amount at the timing when the pressing down of the rate selection buttons 5a to 5d is received, renews the number of virtual game balls 208 based on the amount thereof and the exchange rate according to the rate selection buttons 5a to 5d pressed down, and reflects it in the storage device 301 as the number of balls at hand.

When the number of virtual game balls 208 at hand is reflected in the aforementioned manner, the game processing portion 32 monitors an operation of the handle 4, and until the operation of the handle 4 is detected, it becomes a standby state (S140 and S150). Before the aforementioned processing or in parallel with the processing, or after the number of virtual game balls 208 at hand is reflected, the first game processing portion 321 displays the virtual board face 201, the virtual nails 203, the virtual pinwheel 204, the first virtual winning port 205, the virtual out port 206, and the like by the regular game in the game area 200 (S200). Then, when the first game processing portion 321 detects an operation of rotating the handle 4 in the predetermined direction, the first game processing portion 321 in the game processing portion 32 starts the processing of Pachinko by the regular game. Namely, the first game processing portion 321 detects the rotation angle of a position of the handle 4 (S210), and based on the detected rotation angle, the launch speed of the virtual game balls 208 is determined (S220). For a determination method of the launch speed of the virtual game balls 208 based on the rotation angle of the position of the handle 4, there can be used known various methods.

Then, the first game processing portion 321 launches the virtual game balls 208 toward the virtual board face 201 by the determined launch speed (S230), and after the virtual game balls 208 move along the virtual rail 202, the virtual game balls 208 move downward from the upper side of the virtual board face 201. In the first game processing portion 321, FIG. 9 schematically shows one example of a screen in a state wherein the virtual game balls 208 move on the virtual board face 201. Incidentally, in a case wherein a condition that the handle 4 is rotated from an initial position is continuing, the virtual game balls 208 are launched toward the virtual board face 201 at prescribed intervals, for example, at every one second.

The virtual game balls 208 fall while hitting the virtual nails 203, the virtual pinwheel 204, or the like on the virtual board face 201, and while comparing a coordinate position of the virtual game balls 208 with a coordinate of the first virtual winning port 205 (the parent pocket) or the virtual out port 206, in a case wherein the coordinate position of the virtual game balls 208 is determined to be included in a range of the first virtual winning port 205, the relevant virtual game balls 208 are determined to be entered into the first virtual winning port 205 (S240). On the other hand, in a case wherein the coordinate position of the virtual game balls 208 is included in a range of the virtual out port 206, the relevant virtual game balls 208 are collected. Namely, the relevant virtual game balls 208 are deleted from the virtual board face 201. FIG. 10 schematically shows one example of a screen in a state immediately before a virtual game ball 208 is determined to be entered into the first virtual winning port 205.

In a case wherein the virtual game ball 208 is determined to be entered into the first virtual winning port 205, the first game processing portion 321 stops launch processing of the virtual game balls 208 (S250). Namely, even in a case wherein the handle 4 of the game machine is rotating, the virtual game balls 208 are not allowed to be launched. Also, in the first game processing portion 321, the number of virtual game balls 208 set in the first virtual winning port 205 where the virtual game balls 208 have entered is the winning balls, and the number of virtual game balls 208 acquired as the winning balls is added to the number of virtual game balls 208 at hand of a relevant player stored in the storage device 301 so as to be stored. Furthermore, regarding the winning balls to be acquired (for example, 50 balls), the first game processing portion 321 multiplies the exchange rate (for example, 0.2 Hong Kong dollar) to the 50 winning balls, adds it to the amount stored in the storage device 301, and stores it as the new amount. Then, the first game processing portion 321 determines whether other virtual game balls 208 remain in the virtual board face 201, i.e. there are the remaining balls (S260). Determination processing whether there are the remaining balls is possible by a determination whether there is a coordinate of the virtual game balls 208 within a range of a coordinate of the virtual board face 201.

Then, in a case wherein the first game processing portion 321 has determined that there are the virtual game balls 208 on the virtual board face 201, the return processing portion 323 performs the return processing of the remaining balls and the amount corresponding to the number of remaining balls (S270 and S300).

The return processing portion 323 stops a movement of the remaining balls located in the virtual board face 201, and specifies the number of remaining balls (S310 and S320). In that case, based on the coordinate of the virtual game balls 208, the number of virtual game balls 208 within a range of the virtual board face 201 may be counted, or if the first game processing portion 321 controls the number of virtual game balls 208 located in the virtual board face 201 by a variable and the like, the number of virtual game balls 208 may be specified by counting the number of the variable thereof and the like. Then, the return processing portion 323 performs the return processing of the number of virtual game balls 208 at hand by adding the specified number of virtual game balls 208 to the number of virtual game balls 208 at hand at a time to be stored in the storage device 301 (S330). Also, in the return processing portion 323, the exchange rate is multiplied by the specified number of virtual game balls 208 to calculate the amount corresponding to the specified number of virtual game balls 208. Then, the calculated amount is added to the amount stored in the storage device 301 at that time so as to perform the return processing of the amount corresponding to the remaining balls.

After the return processing of the remaining balls and the amount corresponding to that is performed in the return processing portion 323 as mentioned above, the first game processing portion 321 deletes the first virtual winning port 205 from the virtual board face 201 (S280), and the processing of the Tulip game in the second game processing portion 322 is performed (S290 and S400). Incidentally, prior to moving to the Tulip game, the first game processing portion 321 may display a special screen announcing the winning shown in FIG. 11 in order to announce that a player has won the first virtual winning port 205.

The second game processing portion 322 displays the virtual rail 202; the virtual nails 203; the virtual pinwheel 204; the virtual out port 206; and one or more second virtual winning port or ports 207 on the virtual board face 201 (S410). At that time, in addition to the second virtual winning port 207, regarding display positions of the virtual rail 202, the virtual nails 203, the virtual pinwheel 204, and the virtual out port 206, coordinate positions at the time of the regular game in the first game processing portion 321 may be used as they are, or different coordinate positions may be used. Namely, regarding the virtual rail 202, the virtual nails 203, the virtual pinwheel 204, and the virtual out port 206 except for the second virtual winning port 207, an arrangement may be the same as that of the regular game, or may be different from that of the regular game. Also, regarding the virtual nails 203 and the virtual pinwheel 204, in a case wherein the same arrangement is used in the regular game and the Tulip game, when the first game processing portion 321 places the virtual nails 203 and the virtual pinwheel 204 on the virtual board face 201, it is preferable that a position where the second game processing portion 322 places the second virtual winning port 207 is displayed in a position where the virtual nails 203 and the virtual pinwheel 204 are not disposed. Thereby, in the regular game and the Tulip game, the virtual nails 203 and the virtual pinwheel 204 can have the same arrangement.

Incidentally, in a background design of the virtual board face 201, in order to make a player recognize that the player has entered the mode different from the regular game, it is preferable to display a different background design; however, the background design may be the same. One example of a screen in a state transitioned to the processing (the Tulip game) by the second game processing portion 322 is shown in FIG. 12.

The second game processing portion 322 detects the rotation angle of the position of the handle 4 (S420), and based on the detected rotation angle, the launch speed of the virtual game balls 208 is determined (S430). For the determination method of the launch speed of the virtual game balls 208 based on the rotation angle of the position of the handle 4, there can be used the known various methods.

Then, when the second game processing portion 322 launches the virtual game balls 208 toward the virtual board face 201 by the determined launch speed (S440), after the virtual game balls 208 move along the virtual rail 202, the virtual game balls 208 move downward from the upper side of the virtual board face 201. In the second game processing portion 322, FIG. 13 schematically shows one example of a screen in a state wherein the virtual game balls 208 move on the virtual board face 201.

The virtual game balls 208 fall while hitting the virtual nails 203, the virtual pinwheels 204, and the like in the virtual board face 201, and while comparing the coordinate position of the virtual game balls 208 with the coordinate of the second virtual winning ports 207 (the child pocket) or the virtual out port 206, in a case wherein the coordinate position of one of the virtual game balls 208 is determined to be included in a range of one of the second virtual winning ports 207, the relevant virtual game ball 208 is determined to be entered into the second virtual winning port 207 (S450). On the other hand, in the case wherein the coordinate position of the virtual game balls 208 is included in the range of the virtual out port 206, the relevant virtual game balls 208 are collected. Namely, the relevant virtual game balls 208 are deleted from the virtual board face 201. FIG. 14 schematically shows one example of a screen in a state immediately before one of the virtual game balls 208 is determined to be entered into one of the second virtual winning port 207.

In a case wherein the virtual game ball 208 is determined to be entered into the second virtual winning port 207, the second game processing portion 322 stops the launch processing of the virtual game balls 208 (S460). Namely, even in the case wherein the handle 4 of the game machine is rotating, the virtual game balls 208 are not allowed to be launched. Then, the second game processing portion 322 determines whether other virtual game balls 208 remain in the virtual board face 201, i.e. there are the remaining balls (S470). The determination processing whether there are the remaining balls is possible by the determination whether there is the coordinate of the virtual game balls 208 within the range of the coordinate of the virtual board face 201 in the same manner as the first game processing portion 321.

Then, in a case wherein the second game processing portion 322 determines that there are the virtual game balls 208 in the virtual board face 201, the second game processing portion 322 makes the return processing portion 323 perform the return processing of the remaining balls and the amount corresponding to that (S480 and S300).

The return processing portion 323 stops the movement of the remaining balls located in the virtual board face 201, and specifies the number of remaining balls (S310 and S320). In that case, based on the coordinate of the virtual game balls 208, the number of virtual game balls 208 located within the range of the virtual board face 201 may be counted, or if the second game processing portion 322 controls the number of virtual game balls 208 located in the virtual board face 201 by the variable and the like, the number of virtual game balls 208 may be specified by counting the number of the variable thereof and the like. Then, the return processing portion 323 performs the return processing of the number of virtual game balls 208 at hand by adding the specified number of virtual game balls 208 to the number of virtual game balls 208 at hand at the time stored in the storage device 301 (S330). For example, as shown in FIG. 14, the number of virtual game balls 208 at hand of a player at a time of entering the second virtual winning port 207 is 4,979, the amount is 995.80 Hong Kong dollars, the exchange rate is 0.2 Hong Kong dollar, and there are four virtual game balls 208 in the virtual board face 201 as the remaining balls. In that case, the return processing portion 323 adds 4 balls to 4,979 balls at hand stored in the storage device 301, and stores 4,983 balls as the number of virtual game balls 208 at hand of the player. Also, the return processing portion 323 adds 0.8 Hong Kong dollar, where 4 remaining balls and the exchange rate 0.2 Hong Kong dollar are multiplied, to 995.80 Hong Kong dollars of the amount stored in the storage device 301, and stores the amount of a relevant player as 996.60 Hong Kong dollars.

Then, in the second game processing portion 322, the number of virtual game balls 208 set in the second virtual winning port 207 where the virtual game balls 208 have entered is the winning balls, and the number of virtual game balls 208 acquired as the winning balls is added to the number of virtual game balls 208 at hand of the relevant player stored in the storage device 301 and stored (S490). For example, when the virtual game ball 208 enters the second virtual winning port 207, in a case wherein the number of virtual game balls 208 at hand of a player after the return processing in the return processing portion 323 is 4,983 as mentioned above, and the virtual game ball 208 has entered the second virtual winning port 207 set such that the winning balls to be acquired are 50 balls, the second game processing portion 322 stores 5,033 balls as the number of virtual game balls 208 at hand by adding 50 balls to 4,983 balls of the number of balls at hand stored in the storage device 301. Furthermore, since the winning balls to be acquired is 50 balls, the second game processing portion 322 stores 1,006.60 Hong Kong dollars as the amount by multiplying the exchange rate of 0.2 Hong Kong dollar to 50 balls of the number of winning balls, and adding it to the amount of 996.60 Hong Kong dollars stored in the storage device 301 (FIG. 15).

The second game processing portion 322 deletes the second virtual winning port 207 from the virtual board face 201 (S500), and as shown in FIG. 15, displays the screen announcing that a player has won at the second virtual winning port 207 and acquired the winning balls. Then, the second game processing portion 322 finishes the Tulip game, and returns to the regular game in the first game processing portion 321, and the first game processing portion 321 displays the first virtual winning port 205 and the like on the virtual board face 201 (S200). Then, until a handle operation of the game machine is carried out, the first game processing portion 321 keeps the game machine on standby, and by detecting the handle operation, the first game processing portion 321 makes the processing after S210 perform again.

As mentioned above, by repeating the regular game in the first game processing portion 321 and the Tulip game in the second game processing portion 322, the game in the game processing portion 32 is performed. Incidentally, in the aforementioned second game processing portion 322, there has been explained the processing in the case wherein when the virtual game ball 208 enters the second virtual winning port 207, the winning balls are acquired, and the game returns to the regular game; however, it may be structured such that after transitioning to the Tulip game, the Tulip game is performed for a predetermined time. In that case, there is a case wherein the virtual game balls 208 enter the second virtual winning port 207 multiple times. Also, in measuring a time, there may be provided a predetermined time measuring processing portion (not shown in the drawings) in the game machine so as to measure the time. Then, herewith, the second game processing portion 322 is structured so as to return to the regular game in the first game processing portion 321 when the predetermined time measuring processing portion measures that the predetermined time has passed from a start of the Tulip game.

In a case wherein a player desires to finish the game, the player stops the operation of the handle 4 of the game machine, so that the handle 4 returns to the initial position (S150). Then, the first game processing portion 321 or the second game processing portion 322 in the game processing portion 32 keeps on standby until the virtual game balls 208 in the virtual board face 201 disappear, and after the virtual game balls 208 have completely disappeared from the virtual board face 201, in a case wherein there is no remaining amount, the player just has to leave a seat directly.

On the other hand, in a case wherein there is the remaining account, the player carries out the operation of the pressing down of the button 5f for the output of the predetermined ticket provided in the game machine and the like so as to carry over the amount to a next game, and the output processing portion 33 receives the input by the operation thereof. Then, the output processing portion 33 specifies the information of the amount of the player at an ending time stored in the storage device 301. Then, the information is coded, printed in the ticket, and output. Incidentally, in addition to print in the ticket and output, in a case wherein the ticket is not the paper, and is an electronic medium, the information of the amount of the player at the ending time may be stored in the cellular phone, the IC memory of the IC card, and the like that a player uses. By carrying out such output processing, the information of the number of balls at hand stored in the storage device 301 is set to zero.

By carrying out such output processing, a player can carry over the amount at the time of a previous game directly to the time when the player enjoys the next game by the game machine.

INDUSTRIAL APPLICABILITY

By the game machine of the present invention, the game machine which can be operated immediately by a beginner, and the game performance is not impaired as well, can be provided.

EXPLANATION OF SYMBOLS

1: a housing
2: an amount calculation device
3: a control device
4: a handle
5: a button portion
5a to 5d: rate selection buttons (rate selection portion)
5e: a language selection button
5f: a button for a ticket out
5g: a button for adjusting a volume of sound
5h: a button for displaying a screen of a game description (a help button)
5i: a button for displaying a tutorial
5j and 5k: auxiliary buttons
5l: a button for calling a store representative
6: a ticket printer
30: an amount calculation processing portion
31: a rate setting and receiving portion
32: a game processing portion
33: an output processing portion
100: a conventional Pachinko machine
101: a board face
102: a glass plate
110: an upper tray
120: a handle
130: a rail
140: a winning port
200: a game area
201: a virtual board face
202: a virtual rail
203: Virtual nails
204: a virtual pinwheel
205: a first virtual winning port
206: a virtual out port
207: a second virtual winning port
208: virtual game balls
210: an amount display area
211: a credit display area
212: a selection rate display area
213: a selected language display area
214: a sound output selection area
220: an acquisition history display area
221: a maximum-monetary-consumption-amount display area
222: a dividend display area
300: an arithmetic device
301: a storage device
302: an input/output interface
303: a communication interface
321: a first game processing portion
322: a second game processing portion
323: a return processing portion
D: a display device
SP: speakers

What is claimed is:
1. A game machine having an input device and a display device in a housing, comprising:
a first game processing portion performing game processing in a first mode;

a second game processing portion performing game processing in a second mode; and a return processing portion performing return processing of a virtual game ball remaining on a virtual board face in a case of satisfying a predetermined condition, wherein as the game processing in the first mode, the first game processing portion displays at least a virtual board face and a first virtual winning port for transiting to the second mode on the display device, and after the virtual game ball launched onto the virtual board face based on an operation by the input device enters the first virtual winning port, the first virtual winning port is deleted from the virtual board face, as the game processing in the second mode, the second game processing portion displays a second virtual winning port capable of acquiring a winning ball on the virtual board face in the display device, in a case wherein the virtual game ball enters the first virtual winning port in the first mode, and/or in a case wherein the virtual game ball enters the second virtual winning port in the second mode, the return processing portion specifies a number of virtual game balls remaining on the virtual board face, deletes the number of virtual game balls from the display device, and adds the number of virtual game balls to the number of virtual game balls at hand of a player, and the first game processing portion or the second game processing portion calculates and displays a maximum monetary consumption amount per unit time by calculating the maximum number of virtual game balls capable of being launched per unit time and a selected exchange rate.

2. A game machine having an input device and a display device in a housing, comprising:

a first game processing portion performing game processing in a first mode; and a second game processing portion performing game processing in a second mode, wherein as the game processing in the first mode, the first game processing portion displays at least a virtual board face and a first virtual winning port for transiting to the second mode on the display device, and after a virtual game ball launched onto the virtual board face based on an operation by the input device enters the first virtual winning port, the first virtual winning port is deleted from the virtual board face, and as the game processing in the second mode, the second game processing portion displays a second virtual winning port capable of acquiring a winning ball on the virtual board face in the display device.

3. A game machine according to claim 2, wherein in the second game processing portion, after the virtual game ball launched onto the virtual board face based on an operation by the input device enters the second virtual winning port displayed on the virtual board face, a number of won virtual game balls set in the second virtual winning port is added to number of virtual game balls at hand of a player as a winning ball.

4. A game machine according to claim 2, wherein in the second game processing portion, after the virtual game ball launched onto the virtual board face based on the operation by the input device enters the second virtual winning port displayed on the virtual board face, the second virtual winning port is deleted from the virtual board face, and the first game processing portion displays the first virtual winning port on the virtual board face.

5. A game machine according to claim 2, wherein the first game processing portion and/or the second game processing portion calculates a maximum monetary consumption amount per unit time by calculating a maximum number of virtual game balls capable of being launched per unit time and a selected exchange rate, and displays the amount on the display device.

6. A game machine having an input device and a display device in a housing, comprising:

a game processing portion performing game processing; and a return processing portion performing return processing of a virtual game ball remaining on a virtual board face, wherein as the game processing, the game processing portion displays at least a virtual board face and a virtual winning port on the display device, and performs processing of determining whether a virtual game ball launched onto the virtual board face based on an operation by the input device has entered the virtual winning port, and the return processing portion specifies a number of virtual game balls remaining on the virtual board face in a case of determining that the virtual game ball has entered the virtual winning port, deletes the number of virtual game balls from the display device, and adds the number of virtual game balls to virtual game balls at hand of a player.

* * * * *